(12) United States Patent
Katayama et al.

(10) Patent No.: US 11,575,339 B2
(45) Date of Patent: Feb. 7, 2023

(54) POWER-SUPPLY APPARATUS AND ELECTRIC WORKING MACHINE SYSTEM

(71) Applicant: MAKITA CORPORATION, Anjo (JP)

(72) Inventors: Junichi Katayama, Anjo (JP); Hitoshi Suzuki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/836,021

(22) Filed: Jun. 9, 2022

(65) Prior Publication Data

US 2022/0302869 A1 Sep. 22, 2022

Related U.S. Application Data

(63) Continuation of application No. 16/825,384, filed on Mar. 20, 2020, now Pat. No. 11,394,339.

(30) Foreign Application Priority Data

Mar. 29, 2019 (JP) .............................. JP2019-067691

(51) Int. Cl.
*H02P 31/00* (2006.01)
*H02P 29/40* (2016.01)
*H02P 29/68* (2016.01)
*H01R 31/06* (2006.01)
*H02J 7/00* (2006.01)
*H02P 27/06* (2006.01)

(52) U.S. Cl.
CPC ............ *H02P 29/40* (2016.02); *H01R 31/06* (2013.01); *H02J 7/0063* (2013.01); *H02P 29/68* (2016.02); *H02P 27/06* (2013.01)

(58) Field of Classification Search
CPC .......... H02P 29/40; H02P 29/68; H02P 27/06; H01R 31/06; H02J 7/0063
See application file for complete search history.

(56) References Cited

U.S. PATENT DOCUMENTS

| | | | |
|---|---|---|---|
| 4,086,643 A | | 4/1978 | Jacobs |
| 4,366,531 A | * | 12/1982 | Karadsheh ............ H02M 3/142 363/124 |
| 9,685,800 B2 | | 6/2017 | Hatakeyama et al. |

(Continued)

FOREIGN PATENT DOCUMENTS

| | | |
|---|---|---|
| EP | 3441192 A1 | 2/2019 |
| JP | 4556929 B2 | 10/2010 |

OTHER PUBLICATIONS

Sep. 10, 2020 Extended Search Report issued in European Patent Application No. 20165155.1.

*Primary Examiner* — Muhammad S Islam
(74) *Attorney, Agent, or Firm* — Oliff PLC

(57) ABSTRACT

One aspect of the present disclosure is a power-supply apparatus to supply an electric power to an electric working machine including a trigger switch, a motor, and a tool. The power-supply apparatus includes a connection detector, a trigger detector, and a signal outputter. In response to (i) the connection detector detecting connection of the electric working machine to the power-supply apparatus, and also to (ii) the trigger detector detecting an ON state of the trigger switch, the signal outputter outputs, to the electric working machine, a discharge prohibition signal prohibiting supply of the electric power to the motor, until an OFF state of the trigger switch is detected once by the trigger detector.

17 Claims, 12 Drawing Sheets

(56) References Cited

U.S. PATENT DOCUMENTS

| | | | |
|---|---|---|---|
| 10,454,363 B1* | 10/2019 | Chung | H02M 3/33592 |
| 2007/0108941 A1 | 5/2007 | Sainomoto et al. | |
| 2008/0061742 A1 | 3/2008 | Funabashi et al. | |
| 2010/0085010 A1 | 4/2010 | Suzuki et al. | |
| 2011/0000689 A1 | 1/2011 | Funabashi et al. | |
| 2011/0037435 A1 | 2/2011 | Funabashi et al. | |
| 2011/0242717 A1 | 10/2011 | Funabashi et al. | |
| 2012/0274245 A1 | 11/2012 | Takano et al. | |
| 2012/0306291 A1 | 12/2012 | Wirnitzer | |
| 2013/0033233 A1 | 2/2013 | Noda et al. | |
| 2013/0033790 A1 | 2/2013 | Kobayakawa et al. | |
| 2013/0062955 A1 | 3/2013 | Suzuki | |
| 2013/0098646 A1 | 4/2013 | Funabashi et al. | |
| 2014/0015451 A1 | 1/2014 | Funabashi et al. | |
| 2014/0042951 A1* | 2/2014 | Chen | H02P 31/00 318/689 |
| 2014/0159640 A1 | 6/2014 | Yoshikawa et al. | |
| 2014/0217934 A1 | 8/2014 | Suzuki | |
| 2014/0292245 A1 | 10/2014 | Suzuki et al. | |
| 2014/0300366 A1 | 10/2014 | Kobayakawa et al. | |
| 2014/0306660 A1 | 10/2014 | Suzuki et al. | |
| 2014/0375231 A1 | 12/2014 | Suzuki et al. | |
| 2016/0028344 A1 | 1/2016 | Kusakawa et al. | |
| 2016/0065084 A1 | 3/2016 | Suzuki et al. | |
| 2016/0241178 A1 | 8/2016 | Fujinami et al. | |
| 2017/0062877 A1 | 3/2017 | Fukumoto et al. | |
| 2017/0194670 A1 | 7/2017 | Kawano et al. | |
| 2017/0273239 A1 | 9/2017 | Ota et al. | |
| 2018/0152120 A1 | 5/2018 | Yabuguchi | |

* cited by examiner

POWER-SUPPLY APPARATUS AND ELECTRIC WORKING MACHINE SYSTEM

CROSS-REFERENCE TO RELATED APPLICATIONS

This application is a Continuation Application of U.S. patent application Ser. No. 16/825,384, filed Mar. 20, 2020, which claims the benefit of Japanese Patent Application No. 2019-067691 filed on Mar. 29, 2019 with the Japan Patent Office, the entire disclosures of each of which are incorporated herein by reference.

BACKGROUND

The present disclosure relates to a technique for inhibiting a sudden restart of an electric working machine.

The power tool disclosed in Japanese Patent No. 4556929 is configured such that, when it is connected to the battery pack while the trigger switch is in an ON state, power supply from the battery pack to the power tool is interrupted to inhibit the power tool from starting to operate suddenly.

SUMMARY

Conventional battery packs have relatively low power. Thus, such battery packs cannot supply a power tool with electric power so powerful as to cause the power tool to be swung around. Accordingly, even when the power tool starts to operate suddenly, no problematic situation occurs in which the power tool is swung around. This results in existence of power tools not having a restart inhibition function disclosed in Japanese Patent No. 4556929.

On the other hand, battery packs of recent years have come to have higher electric power, and thus, there arises a desire to inhibit a power tool from starting to operate suddenly. However, it is difficult to add the restart inhibition function to commercially available power tools having no restart inhibition function.

In one aspect of the present disclosure, it is desirable to be able to provide a technique in which a power-supply apparatus enables inhibition of a sudden restart of an electric working machine.

One aspect of the present disclosure is a power-supply apparatus including a connector, a connection detector, a trigger detector, and/or a signal outputter. The connector is configured to removably connect to an electric working machine. The electric working machine includes a motor configured to generate a driving force by receiving an electric power, and a tool configured to be driven by the driving force generated by the motor. The connection detector is configured, in response to start of output of the electric power, to detect connection of the electric working machine to the power-supply apparatus. The trigger detector is configured to detect a state of a trigger switch of the electric working machine. The signal outputter is configured, in response to (i) the connection detector detecting connection of the electric working machine to the power-supply apparatus, and also to (ii) the trigger detector detecting an ON state of the trigger switch, to output a discharge prohibition signal to the electric working machine until an OFF state of the trigger switch is detected once by the trigger detector. The discharge prohibition signal prohibits supply of the electric power to the motor.

In the case where output of the electric power is started, and then connection of the electric working machine is detected and also the ON state of the trigger switch is detected, the discharge prohibition signal is output to the electric working machine until the OFF state of the trigger switch is detected once. Due to this, even in a case where the electric working machine with the trigger switch thereof being in the ON state is connected to the power-supply apparatus, power supply to the motor of the electric working machine is prohibited and thus start of the electric working machine is inhibited. That is, a sudden restart of the electric working machine can be inhibited by the power-supply apparatus. As a result, a situation can be inhibited in which the motor of the electric working machine, such as a grass cutter or a circular saw, is suddenly rotated, to thereby cause the main body of the electric working machine to be swung around as a reaction thereto, or to thereby cause the tool to suddenly operate. Examples of the tool include a cutting tool such as a blade, a machining tool, a polishing tool such as a grinding stone, and a drilling tool.

The connection detector may be configured, in response to input of an operation signal of the trigger switch from the electric working machine, to detect connection of the electric working machine to the power-supply apparatus. The trigger detector may be configured, in response to input of the operation signal, to detect the ON state of the trigger switch.

Connection of the electric working machine to the power-supply apparatus and the ON state of the trigger switch can be detected in response to input of the single operation signal of the trigger switch.

The signal outputter may be configured, in response to the trigger detector detecting the OFF state of the trigger switch once, to shift to a detection waiting state. The signal outputter may be configured to wait, in the detection waiting state, for detection of the ON state of the trigger switch by the trigger detector.

Once the OFF state of the trigger switch is detected, thereafter, the electric working machine is not started unless a user intendedly turns the trigger switch from OFF to ON. That is, in response to the OFF state of the trigger switch being detected once, a sudden restart of the electric working machine does not occur. Thus, in response to the OFF state of the trigger switch being detected once, the power-supply apparatus can output a discharge permission signal upon the trigger switch entering the ON state and also other conditions being satisfied. Accordingly, in response to the OFF state of the trigger switch being detected once, the power-supply apparatus can shift to the detection waiting state in which detection of the ON state of the trigger switch is awaited. In other words, in response to the OFF state of the trigger switch being detected once, the power-supply apparatus can shift to an output waiting state in which the time for output of the discharge permission signal is awaited.

The power-supply apparatus may further include a discharge determiner configured, in response to the trigger detector (i) detecting the OFF state of the trigger switch once and (ii) then detecting the ON state of the trigger switch, to determine whether the power-supply apparatus is in a dischargeable state.

In response to the OFF state of the trigger switch being detected once and then the ON state of the trigger switch being detected, it is determined whether the power-supply apparatus is in the dischargeable state. Further, in response to a determination that the power-supply apparatus is in the dischargeable state, the discharge permission signal can be output from the power-supply apparatus to the electric working machine.

The power-supply apparatus may further include at least one battery pack, a main body, and an adapter. The main body is configured such that the at least one battery pack is attached thereto. The adapter is configured to be removably attached to the main body, and also configured to be removably connected to the electric working machine. The dischargeable state may be a state in which (i) the adapter is attached to the main body and also (ii) the discharge permission signal is output from the at least one battery pack. The discharge permission signal permits output of the electric power from the at least one battery pack.

In response to attachment of the adapter to the main body of the power-supply apparatus and also to output of the discharge permission signal from the battery pack, the power supply system can be determined to be in a state where discharge from the power-supply apparatus is possible Another aspect of the present disclosure is an electric working machine system including the above-described power-supply apparatus and an electric working machine. A motor is configured to stop in response to the electric working machine receiving the discharge prohibition signal.

Since the discharge prohibition signal output from the power-supply apparatus results in stopping the motor, driving of the motor can be inhibited by the power-supply apparatus.

Still another aspect of the present disclosure is an electric working machine system including the above-described power-supply apparatus and an electric working machine. The electric working machine may include a trigger switch, a motor, a tool, an error detector, a working-machine-side trigger detector, and/or a stop controller. The trigger switch is configured to be operated by a user. The tool is configured to be driven by a driving force generated by the motor. The error detector is configured to detect an error state. The error state is a state in which the motor needs to be stopped. The working-machine-side trigger detector is configured to detect a state of the trigger switch. The stop controller is configured, in response to the error detector detecting the error state, to output a stop signal during a period from detection of the error state till detection of an OFF state of the trigger switch by the working-machine-side trigger detector. The stop signal causes the motor to stop.

In the electric working machine, in response to detection of the error state, the stop signal is output during the period from detection of the error state till detection of the OFF state of the trigger switch. This makes it possible to inhibit the motor from suddenly starting to be driven in a case where the error state, such as a rise in temperature in the power-supply apparatus or in the electric working machine, occurs to stop the motor and then the error state is removed while the trigger switch is kept in the ON state. That is, a sudden restart of the electric working machine can be inhibited not only in the case where the electric working machine is connected to the power-supply apparatus but also in the case where the error state occurs to stop the motor and then the error state is removed.

The electric working machine may further include a working-machine-side connection detector configured to detect connection of the power-supply apparatus to the electric working machine. The motor may be configured to stop in response to the electric working machine receiving the discharge prohibition signal. The stop controller may be configured, in response to (i) the working-machine-side connection detector detecting connection of the power-supply apparatus to the electric working machine, and also to (ii) the working-machine-side trigger detector detecting the ON state of the trigger switch, to output the stop signal until the OFF state of the trigger switch is detected once by the working-machine-side trigger detector.

In the power-supply apparatus, in response to start of output of the electric power, and then to detection of connection of the electric working machine and also to detection of the ON state of the trigger switch, the discharge prohibition signal is output to the electric working machine until the OFF state of the trigger switch is detected once. Then, the motor is stopped with the discharge prohibition signal output from the power-supply apparatus. Moreover, in the electric working machine, in response to detection of connection of the power-supply apparatus and also to detection of the ON state of the trigger switch, the stop signal for stopping the motor is output until the OFF state of the trigger switch is detected once. Thus, a sudden restart of the electric working machine can be inhibited not only by the power-supply apparatus but also by the electric working machine. That is, backup redundancy of a circuit for inhibiting a sudden restart of the electric working machine is achieved, thus enabling improvement of reliability of the circuit for inhibiting the restart.

A power supply connection signal indicating that the power-supply apparatus has been connected to the electric working machine may be input to the working-machine-side connection detector. A first operation signal of the trigger switch may be input to the working-machine-side trigger detector. A working machine connection signal indicating that the electric working machine has been connected to the power-supply apparatus may be input to the connection detector. A second operation signal of the trigger switch may be input to the trigger detector. The second operation signal is independent of the first operation signal.

The first operation signal input to the working-machine-side trigger detector of the electric working machine and the second operation signal input to the trigger detector of the power-supply apparatus are independent of each other. This results in achieving backup redundancy of the operation signal of the trigger switch, thus enabling improvement of reliability of the operation signal of the trigger switch.

The electric working machine may further include a working machine control circuit including the working-machine-side connection detector and the working-machine-side trigger detector. The power supply connection signal may be a reset cancellation signal to be input to the working machine control circuit.

Generally, in response to start of power supply to an apparatus including a control circuit, a reset cancellation signal is input to the control circuit. Similarly, in response to start of power supply to the electric working machine, the reset cancellation signal is input to the working machine control circuit. Since this reset cancellation signal is used as the power supply connection signal, the reset cancellation signal can be utilized effectively.

The electric working machine may further include a contact including two contact points, and a slide resistor. The contact is configured such that an operation of the trigger switch results in making and breaking contact between the two contact points. The slide resistor is configured such that a value of resistance varies in association with the operation of the trigger switch. The first operation signal may be output from a first one of the contact and the slide resistor, and the second operation signal may be output from a second one of the contact and the slide resistor.

A first one of the first operation signal and the second operation signal is output from the contact configured such that the operation of the trigger switch results in making and breaking contact between the two contact points. Further, a second one of the first operation signal and the second operation signal is output from the slide resistor configured such that the value of resistance varies in association with the operation of the trigger switch. This results in achieving backup redundancy of the operation signal of the trigger switch, thus enabling improvement of reliability of the operation signal of the trigger switch.

The electric working machine may further include a first stop circuit and/or a second stop circuit. The first stop circuit is configured to stop the motor in response to input of the discharge prohibition signal output from the signal outputter. The second stop circuit is configured to stop the motor in response to input of the stop signal output from the stop controller.

The discharge prohibition signal and the stop signal may be input to the mutually different stop circuits to cause the motor to be stopped by the mutually different stop circuits. This results in achieving backup redundancy of stop control of the motor, thus enabling improvement of reliability of the stop control of the motor.

The signal outputter may be configured, in response to the connection detector not detecting connection of the electric working machine, to output the discharge prohibition signal. The electric working machine may further include a working-machine-side connection detector and a signal determiner. The working-machine-side connection detector is configured to detect connection of the power-supply apparatus to the electric working machine. The signal determiner is configured, in response to the working-machine-side connection detector detecting connection of the power-supply apparatus to the electric working machine, to determine whether an output signal from the signal outputter is the discharge prohibition signal or a discharge permission signal. The discharge permission signal is a signal permitting supply of the electric power to the motor. The stop controller may be configured to output the stop signal in response to the signal determiner determining that the output signal is the discharge permission signal.

In the electric working machine, in response to detection of connection of the power-supply apparatus, it is determined whether the output signal from the power-supply apparatus is the discharge prohibition signal or the discharge permission signal. Then, in response to the output signal being the discharge permission signal although the output signal should be the discharge prohibition signal when the power-supply apparatus is in a non-faulty state, the stop signal is output to cause the motor to stop. That is, in response to a determination that the output signal from the power-supply apparatus is faulty, the motor is stopped. This enables improvement of reliability of the output signal from the power-supply apparatus.

The electric working machine system may further include a notifier configured, in response to the signal determiner determining that the output signal is the discharge permission signal, to notify a state in which the output signal from the power-supply apparatus is faulty.

Since a faulty state of the output signal from the power-supply apparatus is notified by the notifier, the user can recognize the faulty state of the output signal from the power-supply apparatus.

The power-supply apparatus may further include a communicator configured, in response to the connection detector detecting connection of the electric working machine to the power-supply apparatus, to perform an initial communication with the electric working machine. The signal outputter may be configured, in response to (i) the communicator completing the initial communication, and also to (ii) the trigger detector detecting the OFF state of the trigger switch, to switch an output signal to be output from the signal outputter from the discharge prohibition signal to a discharge permission signal. The discharge permission signal is a signal permitting supply of the electric power to the motor.

In response to completion of the initial communication and also to detection of the OFF state of the trigger switch, the output signal is switched from the discharge prohibition signal to the discharge permission signal. Since the output signal is switched from the discharge prohibition signal to the discharge permission signal while the trigger switch is in the OFF state, an output signal can be switched in a state where the motor is properly stopped. In addition, since the output signal is switched from the discharge prohibition signal to the discharge permission signal while the trigger switch is in the OFF state, the motor can be driven immediately upon the trigger switch entering the ON state.

The present disclosure further discloses the following items.

[Item 1]

An electric working machine, comprising:
a trigger switch configured to be operated by a user;
a motor;
a tool configured to be driven by a driving force generated by the motor;
an error detector configured to detect an error state, the error state being a state in which the motor needs to be stopped;
a working-machine-side trigger detector configured to detect a state of the trigger switch; and/or
a stop controller configured, in response to the error detector detecting the error state, to output a stop signal during a period from detection of the error state till detection of an OFF state of the trigger switch by the working-machine-side trigger detector, the stop signal causing the motor to stop.

Such an electric working machine makes it possible to inhibit a sudden restart of the electric working machine at occurrence of the error state.

[Item 2]

The electric working machine according to item 1, further comprising:
a working-machine-side connection detector configured to detect connection of a power-supply apparatus,
wherein the motor is configured to stop in response to the electric working machine receiving a discharge prohibition signal, and/or
wherein the stop controller is configured, in response to (i) the working-machine-side connection detector detecting connection of the power-supply apparatus, and also to (ii) the working-machine-side trigger detector detecting an ON state of the trigger switch, to output the stop signal until the OFF state of the trigger switch is detected once by the working-machine-side trigger detector.

[Item 3]

The electric working machine according to item 2,
wherein the power-supply apparatus includes:
a connection detector configured to detect connection of the electric working machine to the power-supply apparatus; and
a trigger detector configured to detect a state of the trigger switch,
wherein a power supply connection signal indicating that the power-supply apparatus has been connected to the electric working machine is input to the working-machine-side connection detector,
wherein a first operation signal of the trigger switch is input to the working-machine-side trigger detector, wherein a working machine connection signal indicating that the electric working machine has been connected to the power-supply apparatus is input to the connection detector, and/or wherein a second operation signal of the trigger switch is input to the trigger detector, the second operation signal being independent of the first operation signal.

[Item 4]

The electric working machine according to item 3, further comprising:

a working machine control circuit including the working-machine-side connection detector and the working-machine-side trigger detector, wherein the power supply connection signal is a reset cancellation signal to be input to the working machine control circuit.

[Item 5]

The electric working machine according to item 3 or item 4, further comprising:

a contact including two contact points; and/or a slide resistor, the contact being configured such that an operation of the trigger switch results in making and breaking contact between the two contact points, the slide resistor being configured such that a value of resistance varies in association with the operation of the trigger switch, wherein the first operation signal is output from a first one of the contact and the slide resistor, and/or wherein the second operation signal is output from a second one of the contact and the slide resistor.

[Item 6]

The electric working machine according to any one of item 2 to item 5, further comprising:

a first stop circuit configured to stop the motor in response to input of the discharge prohibition signal output from the power-supply apparatus; and/or a second stop circuit configured to stop the motor in response to input of the stop signal output from the stop controller.

[Item 7]

The electric working machine according to any one of item 1 to item 6, being configured to be connected to the power-supply apparatus to receive supply of an electric power from the power-supply apparatus, the electric working machine further comprising:

a signal determiner configured, in response to the working-machine-side connection detector detecting connection of the power-supply apparatus to the electric working machine, to determine whether an output signal from the power-supply apparatus is the discharge prohibition signal or a discharge permission signal, the discharge prohibition signal prohibiting supply of the electric power to the motor, the discharge permission signal permitting supply of the electric power to the motor, wherein the stop controller is configured to output the stop signal in response to the signal determiner determining that the output signal is the discharge permission signal.

[Item 8]

The electric working machine according to item 7, further comprising:

a notifier configured, in response to the signal determiner determining that the output signal is the discharge permission signal, to notify a state in which the output signal from the power-supply apparatus is faulty.

[Item 9]

An electric working machine system, comprising:

the electric working machine according to any one of item 1 to item 8; and any power-supply apparatus described above.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

First Embodiment

Figure 1:
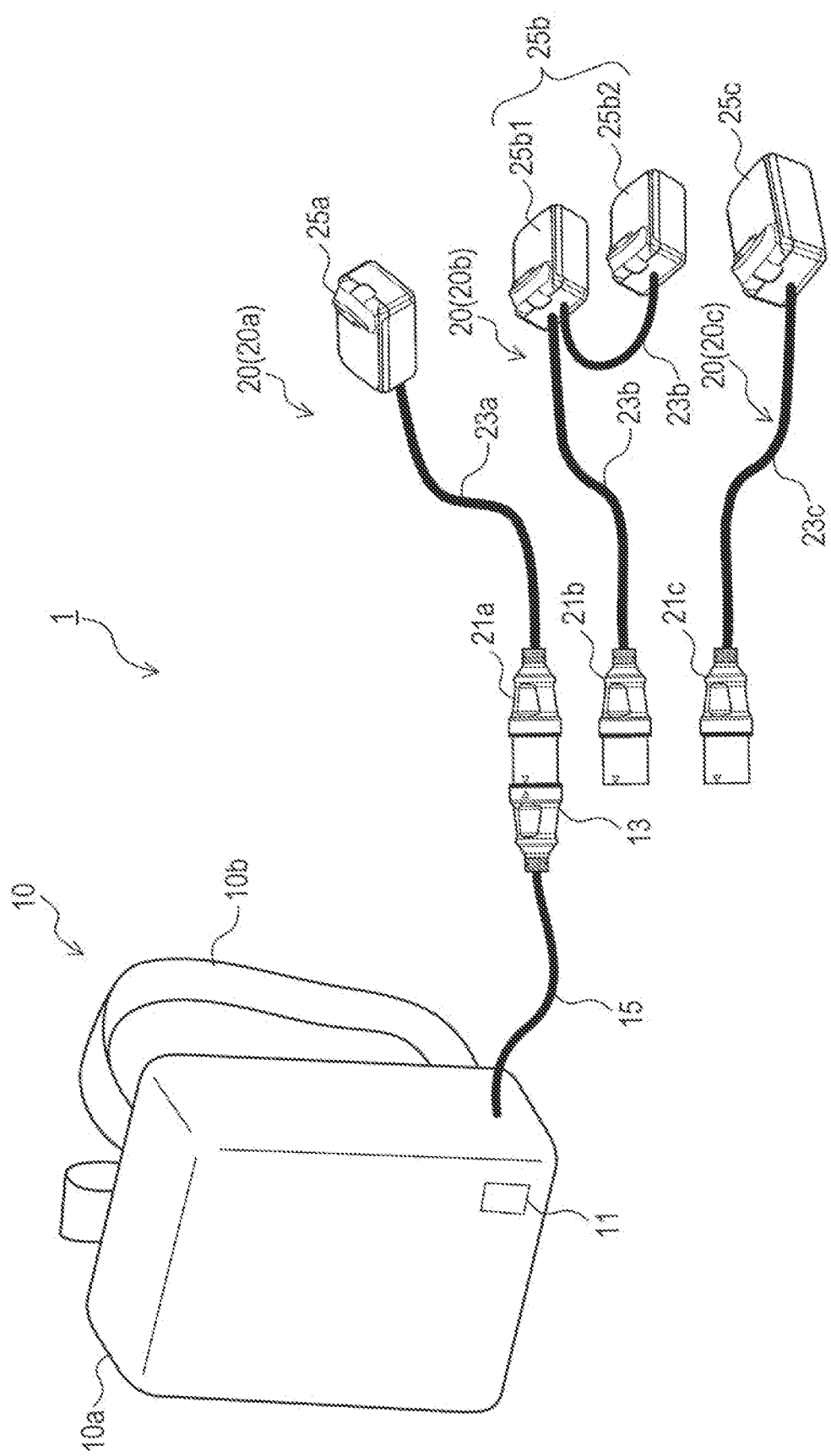
FIG. 1 is a diagram showing an external appearance of a portable power-supply unit according to a first embodiment.

<1-1. Overall Configuration of Portable Power-Supply Unit>

In the present embodiment, a portable power-supply unit 1 (hereinafter referred to as a power-supply unit 1) is used as a power-supply apparatus supplying electric power to an electric working machine. A configuration of the power-supply unit 1 of the present embodiment will be described with reference to FIGS. 1 to 3. The power-supply unit 1 includes a portable power supply 10 and a tool adapter 20 (hereinafter referred to as an adapter 20), and is configured to supply electric power to the electric working machine connected to the adapter 20. Examples of the electric working machine include a power tool and an electric apparatus for gardening. Such electric working machines include, for example, a working machine driven by one 18 V battery pack connected thereto, a working machine driven by two 18

V battery packs connected thereto, and a working machine driven by one 36 V battery pack connected thereto.

Figure 2:
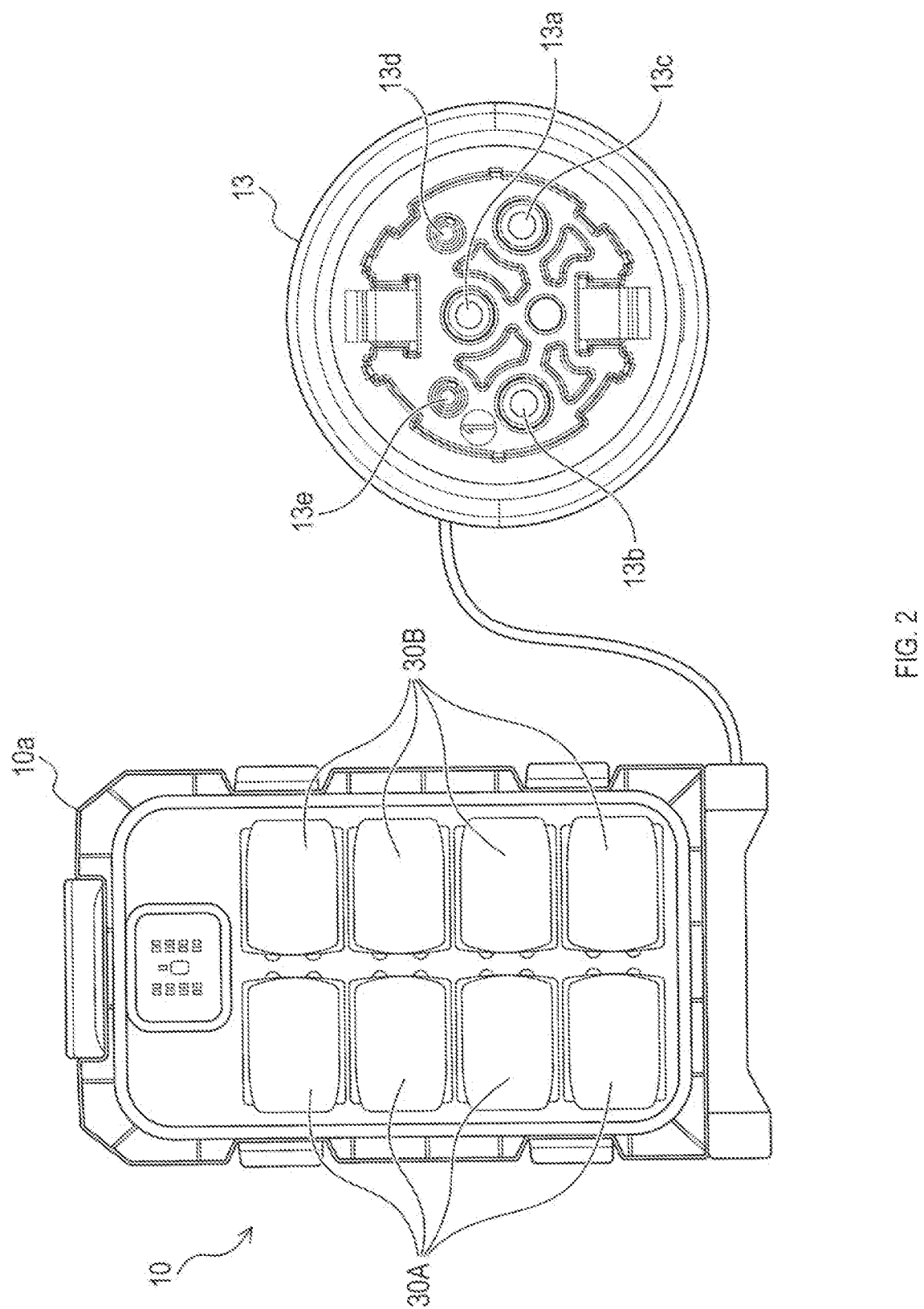
FIG. 2 is a diagram showing a terminal configuration of a connector of the portable power-supply unit according to the first embodiment.

As shown in FIG. 1, the portable power supply 10 includes a main body 10a, a shoulder strap 10b, an output connector 13, and an output extension cable 15. Further, as shown in FIG. 2, the portable power supply 10 includes battery packs 30A and 30B housed in the main body 10a. FIG. 2 shows a state in which a cover of the main body 10a is opened.

The main body 10a is configured to accommodate up to 8 battery packs 30A and 30B in total. A rated output voltage of each of the battery packs 30A and 30B is 18 V. The main body 10a is provided with a main power switch 11. Further, the main body 10a houses therein a control circuit board including a power-supply unit control circuit 12 to be described below.

The shoulder strap 10b is fixed to the main body 10a so that a user can carry the main body 10a on the back. The output connector 13 is connected to the main body 10a via the output extension cable 15. The output connector 13 is configured to be connectable to a connector of the adapter 20.

The adapter 20 includes a first-voltage adapter 20a, a multi-output adapter 20b, and a second-voltage adapter 20c. To be connected to the output connector 13 is any one of a first-voltage connector 21a, a multi-output connector 21b, and a second-voltage connector 21c. The power-supply unit 1 is configured such that power supply to the electric working machine is enabled by connecting the adapter 20 to the electric working machine, instead of connecting thereto a battery pack.

The first-voltage adapter 20a includes one 18 V output system, and outputs a voltage of 18 V of the one system to the electric working machine. The first-voltage adapter 20a includes the first-voltage connector 21a, an apparatus connection cable 23a, and an apparatus connection device 25a.

The multi-output adapter 20b includes two 18 V output systems, and outputs voltages of 18 V of the two systems to the electric working machine. The multi-output adapter 20b includes the multi-output connector 21b, an apparatus connection cable 23b, and an apparatus connection device 25b. The apparatus connection device 25b includes a first apparatus connection device 25b1 and a second apparatus connection device 25b2.

The second-voltage adapter 20c includes one 36 V output system, and outputs a voltage of 36 V of the one system to the electric working machine. The second-voltage adapter 20c includes the second-voltage connector 21c, an apparatus connection cable 23c, and an apparatus connection device 25c.

Next, an explanation will be given of a connection configuration of the battery packs 30A and 30B housed in the main body 10a. As shown in FIG. 2, the output connector 13 includes a negative terminal 13a, a first positive terminal 13b, a second positive terminal 13c, an identifier acquisition terminal 13d (hereinafter referred to as an ID acquisition terminal 13d), and a signal input/output terminal 13e.

An electric potential of the negative terminal 13a corresponds to a reference potential (=0 V) of an output voltage. The first positive terminal 13b is used to output one voltage of 18 V or to output two voltages of 18 V. The second positive terminal 13c is used to output a voltage of 36 V or to output two voltages of 18 V. The ID acquisition terminal 13d is used to acquire identification information of the adapter 20 connected to the output connector 13. The signal input/output terminal 13e is used to acquire a trigger operation signal from the electric working machine, as well as to output a discharge permission signal or a discharge prohibition signal to the electric working machine.

Figure 3:
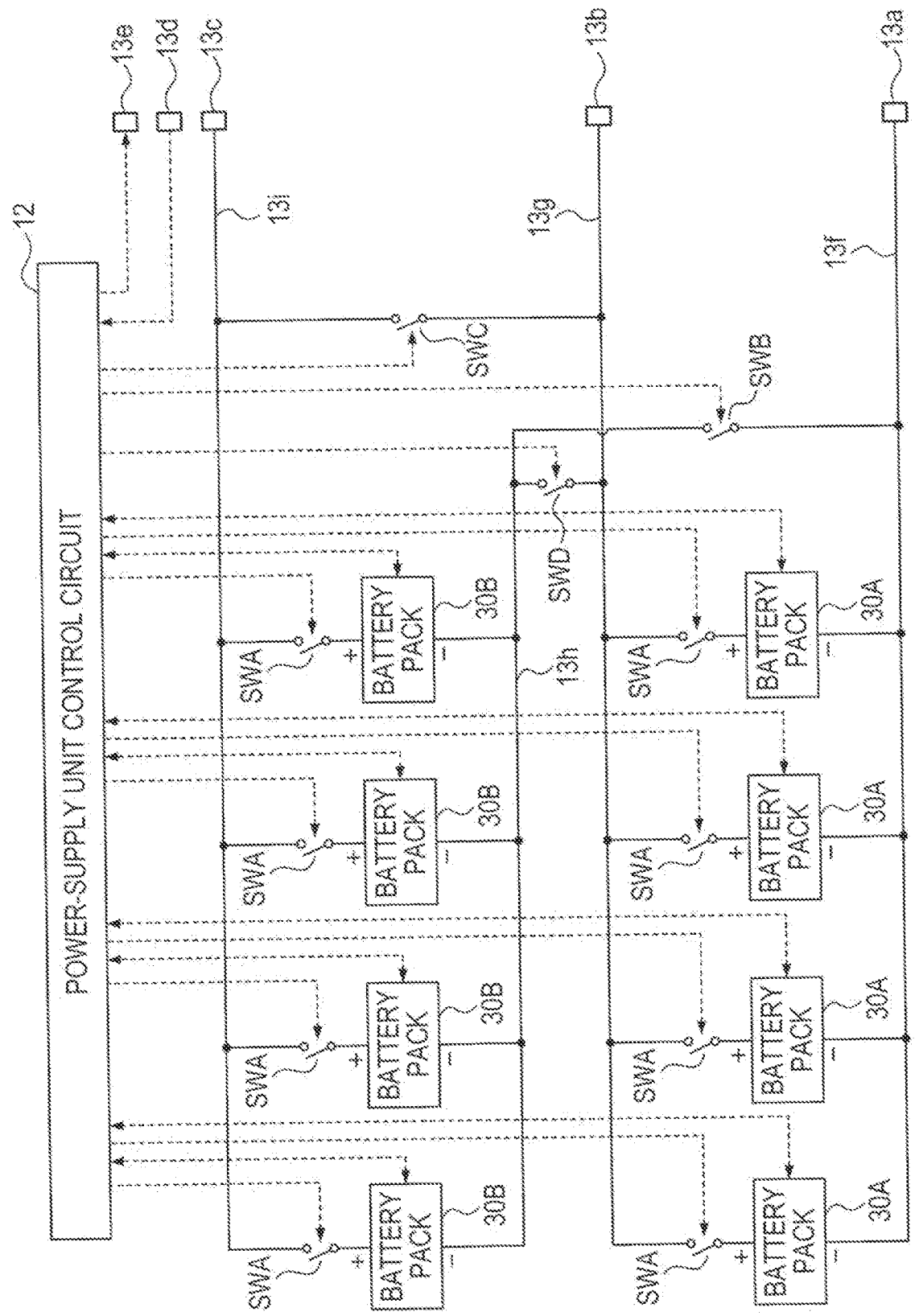
FIG. 3 is a diagram showing a connection configuration of battery packs in the portable power-supply unit according to the first embodiment.

As shown in FIG. 3, the four battery packs 30A are connected in parallel between the negative terminal 13a and the first positive terminal 13b. Connected to each battery pack 30A is a switch SWA. Specifically, a negative electrode of each battery pack 30A is connected to a first negative electrode line 13f, and the first negative electrode line 13f is connected to the negative terminal 13a. A positive electrode of each battery pack 30A is connected to a first positive electrode line 13g via the corresponding switch SWA, and the first positive electrode line 13g is connected to the first positive terminal 13b.

The four battery packs 30B are connected in parallel between the negative terminal 13a and the second positive terminal 13c. Connected to each battery pack 30B is a switch SWA. Specifically, a negative electrode of each battery pack 30B is connected to a second negative electrode line 13h, and the second negative electrode line 13h is connected to the first negative electrode line 13f via a switch SWB. A positive electrode of each battery pack 30B is connected to a second positive electrode line 13i via the corresponding switch SWA, and the second positive electrode line 13i is connected to the second positive terminal 13c.

Further, the second positive electrode line 13i is connected to the first positive electrode line 13g via a switch SWC, and the second negative electrode line 13h is connected to the first positive electrode line 13g via a switch SWD.

Switching (i.e., ON/OFF) of the eight switches SWA, the switch SWB, the switch SWC, and the switch SWD is controlled by the power-supply unit control circuit 12. Specifically, in response to acquiring identification information of the first-voltage adapter 20a through the ID acquisition terminal 13d, the power-supply unit control circuit 12 turns OFF the switches SWB, SWC, and SWD. Further, the power-supply unit control circuit 12 selects, from the four battery packs 30A, the battery pack 30A to be discharged, and turns ON the switch SWA connected to the selected battery pack 30A. This allows the voltage of 18 V across the negative terminal 13a and the first positive terminal 13b to be output through the first positive terminal 13b.

The power-supply unit control circuit 12 includes a CPU and a memory, and the CPU executes a program stored in the memory to thereby achieve various functions. For example, in a case where a remaining energy of the selected battery pack 30A becomes less, the power-supply unit control circuit 12 switches the battery pack 30A to be discharged to any one of the other three battery packs 30A. This enables the electric working machine to use electric power of the multiple battery packs 30A sequentially.

In response to acquiring identification information of the multi-output adapter 20b through the ID acquisition terminal 13d, the power-supply unit control circuit 12 turns OFF the switches SWB and SWC, and turns ON the switch SWD. Further, the power-supply unit control circuit 12 selects, from the four battery packs 30A and from the four battery packs 30B, respectively, the battery packs 30A and 30B to be discharged, and turns ON the switches SWA connected to the selected battery packs 30A and 30B. This allows the voltage of 18 V across the negative terminal 13a and the first positive terminal 13b to be output through the first positive terminal 13b, and also allows the voltage of 18 V across the first positive terminal 13b and the second positive terminal 13c to be output through the second positive terminal 13c.

In response to acquiring identification information of the second-voltage adapter 20c through the ID acquisition terminal 13d, the power-supply unit control circuit 12 turns OFF the switches SWB and SWC, and turns ON the switch SWD. Further, the power-supply unit control circuit 12 selects, from the four battery packs 30A and from the four battery packs 30B, respectively, the battery packs 30A and 30B to be discharged, and turns ON the switches SWA connected to the selected battery packs 30A and 30B. This allows the voltage of 36 V across the negative terminal 13a and the second positive terminal 13c to be output through the second positive terminal 13c.

Figure 4:
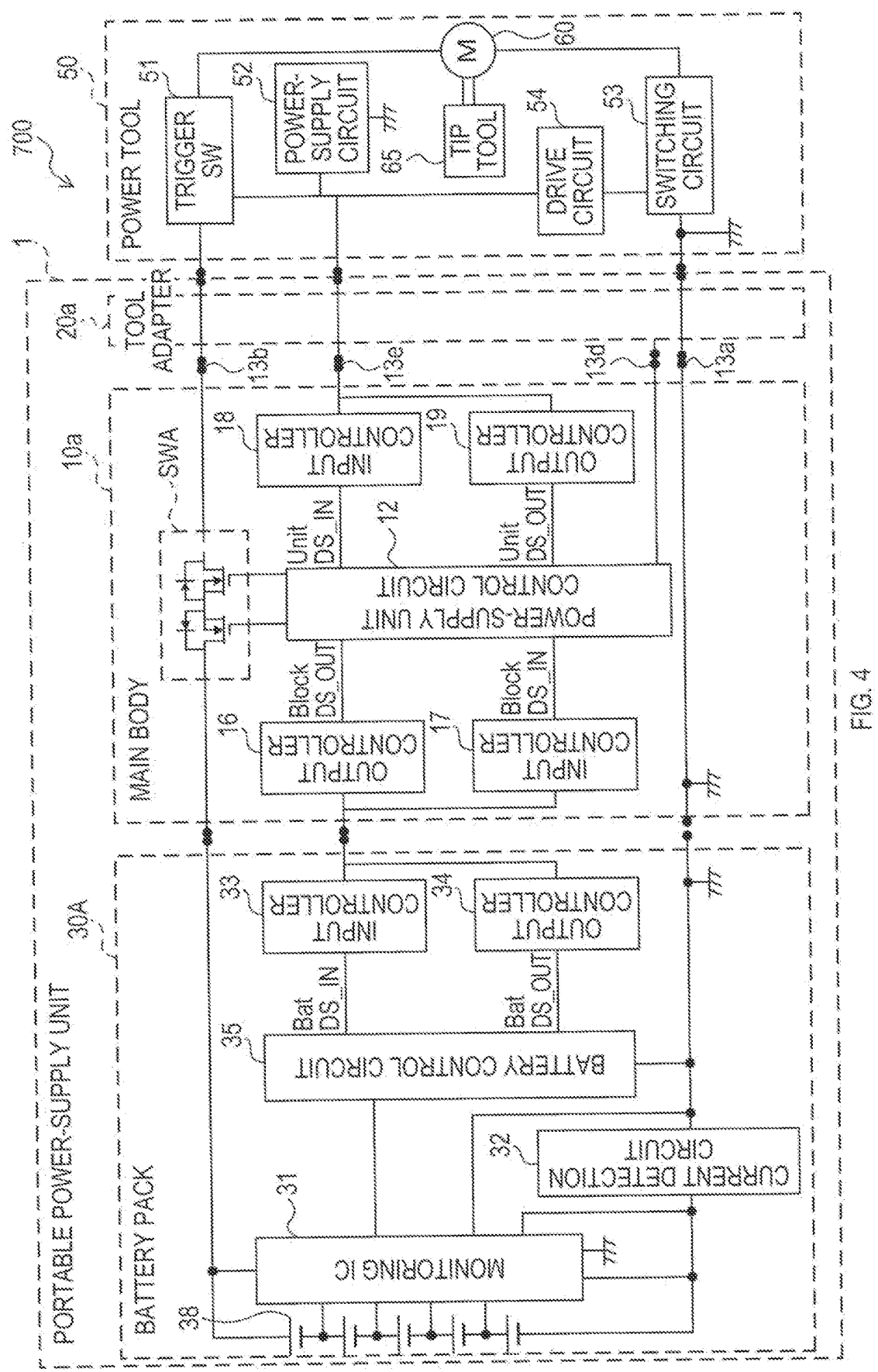
FIG. 4 is a diagram showing a configuration of an electric working machine system according to the first embodiment.

Here, as shown in FIG. 4, the switches SWA may each include two field-effect transistors (FETs). These two FETs are connected in series such that a direction of current flowing between a drain and a source at application of voltage to a gate of one of the FETs is opposite to that of the other of the FETs. It is intrinsic that the FET includes a parasitic diode connected in parallel between the drain and the source, and this parasitic diode enables conduction in a reverse direction at no application of voltage to the gate. In this regard, as shown in FIG. 4, it is possible to avoid bidirectional current flow (discharge current and charging current) in the battery packs 30A and 30B by turning OFF both of the two FETs connected in series. In contrast, the switch SWA can be conducted by turning ON both of the two FETs connected in series. Similarly to the switch SWA, the switches SWB, SWC, and SWD also may include two FETs connected in series such that a direction of current flowing between a drain and a source at application of voltage to a gate of one of the FETs is opposite to that of the other of the FETs. In a case where charging from a first one of the battery packs 30A and 30B to a second one of the battery packs 30A and 30B is to be permitted, the switches SWA, SWB, SWC, and SWD may be configured with a single FET.

<1-2. Configuration of Electric Working Machine System>

Next, an electrical configuration of an electric working machine system 700 of the present embodiment will be described with reference to FIG. 4. Here, by way of example, the electric working machine is a power tool 50 driven with a voltage of 18 V.

The electric working machine system 700 includes the power-supply unit 1 and the power tool 50. The power-supply unit 1 includes the main body 10a, the battery pack 30A, and the first-voltage adapter 20a. The main body 10a is connected to the battery pack 30A, and also connected to the power tool 50 via the first-voltage adapter 20a.

The main body 10a includes the power-supply unit control circuit 12, input controllers 17 and 18, output controllers 16 and 19, and the switch SWA.

As described above, the power-supply unit control circuit 12 acquires the identification information of the first-voltage adapter 20a through the ID acquisition terminal 13d, and controls the switches SWA, SWB, SWC, and SWD. Further, the power-supply unit control circuit 12 performs a restart inhibition process to be described later.

The input controller 18 acquires a trigger operation signal of the power tool 50 through the signal input/output terminal 13e, and outputs the acquired trigger operation signal to the power-supply unit control circuit 12. The trigger operation signal indicates an operation state of a trigger switch 51 of the power tool 50. In a case where the trigger switch 51 is in an ON state, the trigger operation signal as a HIGH signal is input to the signal input/output terminal 13e. In a case where the trigger switch 51 is in an OFF state, and in a case where the power tool 50 is not connected, the trigger operation signal as a LOW signal is input to the signal input/output terminal 13e. That is, in such cases, no signal is input to the signal input/output terminal 13e.

The power-supply unit control circuit 12 detects that the power tool 50 is connected to the first-voltage adapter 20a based on the input of the trigger operation signal. Further, the power-supply unit control circuit 12 detects the ON state of the trigger switch 51 based on the input of the trigger operation signal.

The power-supply unit control circuit 12 outputs the acquired trigger operation signal to the battery pack 30A via the output controller 16. The input controller 17 acquires a discharge permission signal or a discharge prohibition signal output from the battery pack 30A, and outputs the acquired signal to the power-supply unit control circuit 12.

The power-supply unit control circuit 12 determines whether to permit or prohibit power supply to a motor 60 of the power tool 50 based on the discharge permission signal or the discharge prohibition signal output from the battery pack 30A and on other conditions. Subsequently, the power-supply unit control circuit 12 outputs, to the output controller 19, the discharge permission signal for permitting power supply to the motor 60, or the discharge prohibition signal for prohibiting power supply to the motor 60. The output controller 19 outputs the discharge permission signal or the discharge prohibition signal to the power tool 50 through the signal input/output terminal 13e.

In the present embodiment, the functions achieved by the power-supply unit control circuit 12 each correspond to one example of a connection detector, a trigger detector, a signal outputter, a discharge determiner of the present disclosure.

The battery pack 30A includes a battery control circuit 35, a monitoring IC 31, a current detection circuit 32, an input controller 33, an output controller 34, and a battery 38.

The battery 38 includes battery cells connected in series to each other. The current detection circuit 32 detects charging current flowing into the battery 38 and discharge current flowing from the battery 38, and outputs detected values to the battery control circuit 35. The monitoring IC 31 detects a cell voltage of each battery cell included in the battery 38, a cell temperature of at least one battery cell, and the like, and outputs detected values to the battery control circuit 35.

The battery control circuit 35 includes a CPU, a memory, and so forth, and the CPU executes a program stored in the memory to thereby achieve various functions. For example, the battery control circuit 35 detects an ON state of the trigger switch 51 and connection of the power tool 50 from the input trigger operation signal. Further, the battery control circuit 35 determines an over-discharge state and an overheated state of the battery 38 based on various detected values input. Based on the result of the determination, the battery control circuit 35 outputs, to the output controller 34, the discharge permission signal for permitting power supply from the battery 38 or the discharge prohibition signal for prohibiting power supply from the battery 38. The output controller 34 outputs the discharge permission signal or the discharge prohibition signal to the main body 10a. The battery pack 30B is configured similarly to the battery pack 30A.

The power tool 50 includes the trigger switch 51, a power-supply circuit 52, a drive circuit 54, a switching circuit 53, the motor 60, and a tip tool 65.

The trigger switch 51 is operated by a user to drive the power tool 50. The motor 60 is a brushed direct-current motor. The tip tool 65 is attached to a tip of the power tool 50, and is driven by receiving a driving force generated by the motor 60. Examples of the tip tool 65 include a cutting tool such as a blade, a machining tool, a polishing tool such as a grinding stone, and a drilling tool.

The power-supply circuit 52 generates, from the electric power supplied from the power-supply unit 1, electric power to be supplied to the various circuits, such as the drive circuit 54, contained in the power tool 50. The switching circuit 53 supplies electric current to the motor 60. In response to input of the discharge permission signal from the power-supply unit 1, the drive circuit 54 controls the switching circuit 53 to rotate the motor 60. In response to input of the discharge prohibition signal from the power-supply unit 1, the drive circuit 54 controls the switching circuit 53 to stop the rotation of the motor 60. The motor 60 may be a three-phase brushless motor.

<1-3. Restart Inhibition Process>

Figure 5:
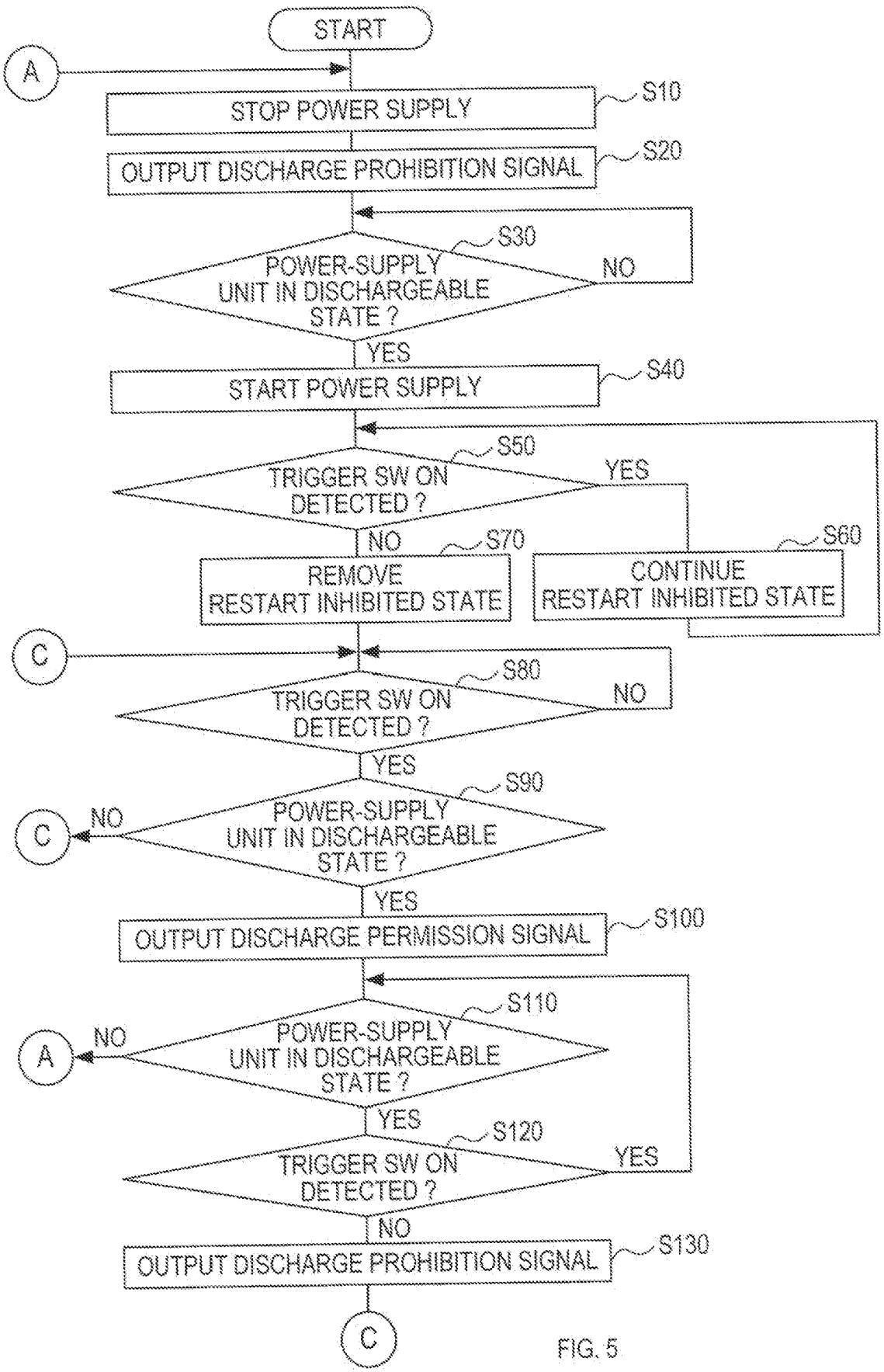
FIG. 5 is a flowchart showing steps of a restart inhibition process according to the first embodiment.

Next, the restart inhibition process performed by the power-supply unit control circuit 12 will be described with reference to a flowchart of FIG. 5. In response to connection of the power-supply unit 1 to the power tool 50 and switching of the main power switch 11 from OFF to ON, the power-supply unit control circuit 12 starts the present process.

Firstly, in S10, power supply to the power tool 50 is stopped. Specifically, the switch SWA is turned OFF.

Then, in S20, the discharge prohibition signal for prohibiting power supply to the motor 60 is output to the power tool 50 through the signal input/output terminal 13e.

Subsequently, in S30, it is determined whether the power-supply unit 1 is in a dischargeable state. The dischargeable state is a state in which any one of the adapters 20a to 20c is connected to the output connector 13 and also the discharge permission signal is output from the battery pack 30A to the main body 10a.

If it is determined in S30 that the power-supply unit 1 is not in the dischargeable state, the power-supply unit control circuit 12 waits until its determination of the dischargeable state. If it is determined in S30 that the power-supply unit 1 is in the dischargeable state, the process proceeds to S40.

In S40, power supply to the power tool 50 is started. Specifically, the switch SWA is turned ON.

Then, in S50, it is determined whether the ON state of the trigger switch 51 is detected. Specifically, it is determined whether the trigger operation signal has been input through the signal input/output terminal 13e. If it is determined in S50 that the ON state of the trigger switch 51 is detected, the process proceeds to S60. The input of the trigger operation signal results in detection of the ON state of the trigger switch 51 and also detection of connection of the power tool 50.

In S60, a restart inhibited state is continued. Specifically, the discharge prohibition signal is continuously output to the power tool 50. Users sometimes change a power-supply apparatus connected to the power tool 50 while the trigger switch 51 remains in an ON state. In this case, in a case where power supply to the motor 60 is permitted in response to detection of the ON state of the trigger switch 51 immediately after or concurrently with detection of connection of the power tool 50, the power tool 50 restarts operation suddenly. In order to inhibit such a sudden restart of the power tool 50, in a case where connection of the power tool 50 is detected and also the ON state of the trigger switch 51 is detected, the discharge prohibition signal is continuously output to the power tool 50 until an OFF state of the trigger switch 51 is detected once.

In contrast, in S50, if it is determined that the ON state of the trigger switch 51 is not detected, that is, if it is determined that the OFF state of the trigger switch 51 is detected, the process proceeds to S70. Here, in response to pressing of the main power switch 11 of a momentary type, the power-supply unit control circuit 12 receives power supply via a not-shown regulator. At this time, the power-supply unit control circuit 12 keeps ON the FET that maintains the power supply. In a case where no signal is input to the power-supply unit control circuit 12 for a while in that state, the power-supply unit control circuit 12 turns OFF the FET that maintains the power supply to thereby shut it down. In response to the main power switch 11 being kept pressed down, the power-supply unit control circuit 12 detects that the main power switch 11 is kept pressed down, and turns OFF the FET that maintains the power supply to thereby shut it down. Thus, the power-supply unit control circuit 12 basically can constantly detect the OFF state of the trigger switch 51.

In S70, the restart inhibited state is removed. In a case where connection of the power tool 50 is detected and also the ON state of the trigger switch 51 is detected, and then the OFF state of the trigger switch 51 is detected once, the motor 60 is not rotated unless the user intendedly switches the trigger switch 51 from OFF to ON. That is, once the OFF state of the trigger switch 51 is detected, a sudden restart of the power tool 50 does not occur. Thus, in this case, the restart inhibited state is removed. Specifically, the power-supply unit control circuit 12 shifts to a detection waiting state in which detection of the ON state of the trigger switch 51 is awaited, while continuing the output of the discharge prohibition signal. In other words, the power-supply unit control circuit 12 shifts to an output waiting state in which the time for output of the discharge permission signal is awaited. Upon completion of the process of S70, the process proceeds to S80.

In S80, it is determined whether the ON state of the trigger switch 51 is detected. If it is determined in S80 that the OFF state of the trigger switch 51 is detected, the power-supply unit control circuit 12 waits until detection of the ON state. If it is determined in S80 that the ON state of the trigger switch 51 is detected, the process proceeds to S90.

In S90, similarly to the process of S30, it is determined whether the power-supply unit 1 is in the dischargeable state. If it is determined in S90 that the power-supply unit 1 is not in the dischargeable state, the process returns to S80. In contrast, if it is determined in S90 that the power-supply unit 1 is in the dischargeable state, the process proceeds to S100.

In S100, the discharge permission signal for permitting power supply to the motor 60 is output to the power tool 50 through the signal input/output terminal 13e.

Subsequently, in S110, it is determined whether the power-supply unit 1 is in the dischargeable state, similarly to the process of S30. If it is determined in S110 that the power-supply unit 1 is not in the dischargeable state, the process returns to S10. In contrast, if it is determined in S110 that the power-supply unit 1 is in the dischargeable state, the process proceeds to S120.

In S120, it is determined whether the ON state of the trigger switch 51 is detected. If it is determined in S120 that the ON state of the trigger switch 51 is detected, the process returns to S110. If it is determined in S120 that the OFF state of the trigger switch 51 is detected, the process proceeds to S130.

In S130, the discharge prohibition signal for prohibiting power supply to the motor 60 is output to the power tool 50 through the signal input/output terminal 13e, and the process returns to S80. This is the end of the present process.

<1-4. Effects>

According to the first embodiment described so far, the following effects are obtained.

(1) In the case where output of the electric power from the power-supply unit 1 is started, and then connection of the power tool 50 is detected and also the ON state of the trigger switch 51 is detected, the discharge prohibition signal is output from the power-supply unit 1 to the power tool 50 until the OFF state of the trigger switch 51 is detected once. Due to this, even in a case where the power tool 50 with the trigger switch 51 being in the ON state is connected to the power-supply unit 1, power supply to the motor 60 is prohibited and thus start of the power tool 50 is inhibited. That is, the power-supply unit 1 can inhibit a sudden restart of the power tool 50.

(2) The power-supply unit 1 can detect connection of the power tool 50 and the ON state of the trigger switch 51 based on input of a single trigger operation signal.

(3) Once the OFF state of the trigger switch 51 is detected, the power-supply unit 1 can shift to the detection waiting state in which detection of the ON state of the trigger switch 51 is awaited.

(4) In the power-supply unit 1, in the case where the OFF state of the trigger switch 51 is detected once, and then the ON state of the trigger switch 51 is detected, it is determined whether the power-supply unit 1 is in the dischargeable state. If it is determined that the power-supply unit 1 is in the dischargeable state, the power-supply unit 1 can output the discharge permission signal to the power tool 50.

(5) In the case where the adapter 20 is connected to the main body 10a and also the discharge permission signal is output from the battery pack 30A, the power-supply unit 1 can be determined to be in a state where discharge from the power-supply unit 1 is possible.

(6) The discharge prohibition signal output from the power-supply unit 1 results in stopping the motor 60. Thus, driving of the motor 60 can be inhibited by the power-supply unit 1.

Second Embodiment

<2-1. Configuration of Electric Working Machine System>

Figure 6:
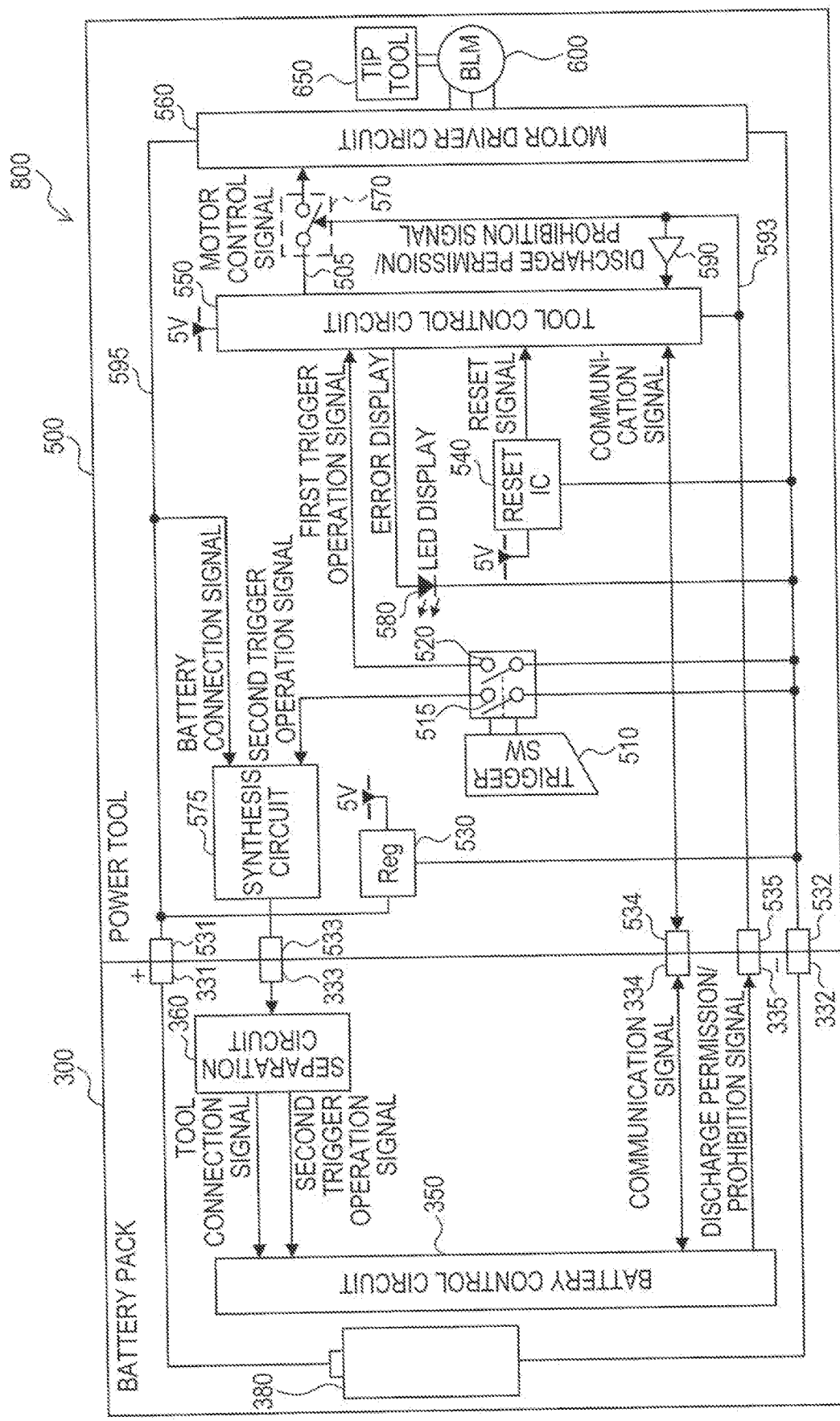
FIG. 6 is a diagram showing a configuration of an electric working machine system according to a second embodiment.

Next, an electric working machine system 800 of a second embodiment will be described with reference to FIG. 6. The electric working machine system 800 includes a battery pack 300 and a power tool 500. That is, the electric working machine system 800 uses, as a power-supply apparatus, the battery pack 300 to be connected directly to the power tool 500.

The battery pack 300 includes a battery 380, a battery control circuit 350, a separation circuit 360, a battery-side positive terminal 331, a battery-side negative terminal 332, a state signal input terminal 333, a battery-side communication terminal 334, and a discharge signal output terminal 335.

The battery-side positive terminal 331 is connected to a tool-side positive terminal 531 of the power tool 500, and the battery-side negative terminal 332 is connected to a tool-side negative terminal 532 of the power tool 500. In response to connection of the battery-side positive terminal 331 to the tool-side positive terminal 531 and connection of the battery-side negative terminal 332 to the tool-side negative terminal 532, power supply from the battery pack 300 to the power tool 500 is started.

The state signal input terminal 333 is connected to a state signal output terminal 533 of the power tool 500, and the discharge signal output terminal 335 is connected to a discharge signal input terminal 535 of the power tool 500. The battery-side communication terminal 334 is connected to a tool-side communication terminal 534 of the power tool 500.

The battery 380 includes battery cells connected in series to each other. A positive electrode of the battery 380 is connected to the battery-side positive terminal 331, and a negative electrode of the battery 380 is connected to the battery-side negative terminal 332. A rated voltage of the battery 380 is, for example, 36 V.

The separation circuit 360 separates a synthesized signal, which is input to the state signal input terminal 333 from the power tool 500, into a tool connection signal and a trigger operation signal based on an electric potential of the state signal input terminal 333. The tool connection signal indicates connection of the power tool 500. The trigger operation signal indicates an ON state of a trigger switch 510 of the power tool 500. The separation circuit 360 outputs the separated tool connection signal and trigger operation signal to the battery control circuit 350.

The battery control circuit 350 includes a CPU, a memory, and so forth, and the CPU executes a program stored in the memory to thereby achieve various functions. For example, the battery control circuit 350 determines whether the battery 380 is in an over-discharge state and/or an overheated state based on detected values of a cell voltage, a cell temperature, and a charge/discharge current of the battery 380 detected by a not-shown detection circuit. Based on the result of the determination, the battery control circuit 350 outputs a discharge permission signal or a discharge prohibition signal to the power tool 500 through the discharge signal output terminal 335. The discharge permission signal is a signal for permitting power supply to a motor 600 of the power tool 500. The discharge prohibition signal is a signal for prohibiting power supply to the motor 600. In a case where connection of the power tool 500 is not detected, the battery control circuit 350 outputs the discharge prohibition signal.

The battery control circuit 350 performs communication, including an initial communication, with a tool control circuit 550 of the power tool 500 through the battery-side communication terminal 334 and the tool-side communication terminal 534. The initial communication is a first communication performed immediately after connection of the battery pack 300 to the power tool 500. Further, the battery control circuit 350 performs a restart inhibition process in the battery pack 300, which is to be described below. In the present embodiment, the functions achieved by the battery control circuit 350 each correspond to one example of a connection detector, a trigger detector, a signal outputter, and a communicator of the present disclosure.

The power tool 500 includes the motor 600, a tip tool 650, the tool control circuit 550, a motor driver circuit 560, a motor stop switch 570, a regulator 530, the trigger switch 510, a first contact 520, a second contact 515, a synthesis circuit 575, a reset IC 540, an LED 580, and a buffer 590. Further, the power tool 500 includes the tool-side positive terminal 531, the tool-side negative terminal 532, the state signal output terminal 533, the tool-side communication terminal 534, and the discharge signal input terminal 535.

The regulator 530 generates, from the electric power supplied from the battery pack 300, electric power of a specified voltage (e.g., 5 V) to be supplied to the various circuits contained in the power tool 500.

The trigger switch 510 is operated by a user to drive the power tool 500. The first contact 520 and the second contact 515 each include two contact points. Operation of the trigger switch 510 results in making and breaking contact between the two contact points of each of the first contact 520 and the second contact 515. The second contact 515 and the first contact 520 are opened and closed independently of each other. In response to the trigger switch 510 entering an ON state, a second trigger operation signal is output to the synthesis circuit 575 via the second contact 515, and a first trigger operation signal is output to the tool control circuit 550 via the first contact 520. The first trigger operation signal and the second trigger operation signal are independent of each other.

In addition to the second trigger operation signal, a battery connection signal is input to the synthesis circuit 575 from a positive electrode line 595 connected to the tool-side positive terminal 531. Connection of the tool-side positive terminal 531 to the battery-side positive terminal 331 raises electric potential of the positive electrode line 595, and the battery connection signal as a HIGH signal is input to the synthesis circuit 575. The synthesis circuit 575 outputs the synthesized signal generated by synthesizing the battery connection signal and the second trigger operation signal to the battery pack 300 through the state signal output terminal 533.

As described above, the second trigger operation signal to be input to the battery control circuit 350 is independent of the first trigger operation signal to be input to the tool control circuit 550. Thus, even in a case where either of the first contact 520 or the second contact 515 fails and outputs a wrong signal, a correct trigger operation signal is input to either of the battery control circuit 350 or the tool control circuit 550.

The motor 600 is a three-phase brushless motor. The motor driver circuit 560 is an inverter circuit configured to drive the motor 600 in accordance with a motor control signal output from the tool control circuit 550. The tip tool 650 is attached to a tip of the power tool 500, and is driven by receiving a driving force generated by the motor 600. Examples of the tip tool 650 include a cutting tool such as a blade, a machining tool, a polishing tool such as a grinding stone, and a drilling tool.

The motor stop switch 570 is provided on a signal output path 505 for outputting the motor control signal from the tool control circuit 550 to the motor driver circuit 560. In FIG. 6, the signal output path 505 is depicted as a simplified single line; in actuality, however, three lines corresponding to the three phases of the signal output path 505 are connected between the tool control circuit 550 and the motor driver circuit 560.

The motor stop switch 570 enters an ON state in response to input of the discharge permission signal through the discharge signal input terminal 535. The ON state of the motor stop switch 570 brings the signal output path 505 to a completed state, and the motor control signal is input to the motor driver circuit 560. The motor stop switch 570 enters an OFF state in response to input of the discharge prohibition signal through the discharge signal input terminal 535. The OFF state of the motor stop switch 570 brings the signal output path 505 to an interrupted state, and the motor control signal is not input to the motor driver circuit 560. Thus, in response to input of the discharge prohibition signal to the power tool 500, rotation of the motor 600 is stopped. In the present embodiment, the motor stop switch 570 corresponds to one example of a first stop circuit of the present disclosure, and the motor driver circuit 560 corresponds to one example of a second stop circuit of the present disclosure.

The discharge permission signal or the discharge prohibition signal output from the battery pack 300 is input to the tool control circuit 550 via the buffer 590 connected to a signal line 593. The signal line 593 is connected to the discharge signal input terminal 535 to transmit the discharge permission signal or the discharge prohibition signal.

In a case where the signal line 593 is directly connected to the tool control circuit 550, the tool control circuit 550 may run away to thereby output a HIGH signal to the signal line 593. This may further lead to incorrect turning of the motor stop switch 570 from OFF to ON. Here, a direction in which the buffer 590 transmits signals is one way from the signal line 593 to the tool control circuit 550. Thus, even in a case where connection of the signal line 593 to the tool control circuit 550 via the buffer 590 causes output of the HIGH signal from the tool control circuit 550, no HIGH signal is output from the buffer 590 to the signal line 593. Accordingly, incorrect turning of the motor stop switch 570 from OFF to ON can be avoided.

The reset IC 540 outputs a reset signal to the tool control circuit 550. In response to receiving the reset signal, the tool control circuit 550 places every internal circuit in its initial state. In a case where a power-supply voltage supplied from the regulator 530 is lower than a specified value, the reset IC 540 continuously outputs the reset signal to the tool control circuit 550. In response to the power-supply voltage exceeding the specified value, the reset IC 540 outputs a reset cancellation signal to the tool control circuit 550. In response to receiving the reset cancellation signal, the tool control circuit 550 start to execute a program.

The LED 580 is a notifier of an error. Examples of a kind of the error to be notified include an error necessitating stopping rotation of the motor 600, such as an overheated state, an over-discharge state, and a failure in the battery pack 300.

The tool control circuit 550 includes a CPU, a memory, and so forth, and the CPU executes a program stored in the memory to thereby achieve various functions. For example, the tool control circuit 550 generates a motor control signal for controlling driving of the motor 600, and outputs the generated motor control signal to the motor driver circuit 560. Further, in response to occurrence of an error, the tool control circuit 550 turns on the LED 580 to notify the error. The tool control circuit 550 may change a light emission pattern and/or a light emission color of the LED 580 in accordance with a kind of the error. Furthermore, the tool control circuit 550 performs a restart inhibition process at power supply connection, and a restart inhibition process at error occurrence, which are to be described below.

In the present embodiment, the functions achieved by the tool control circuit 550 each correspond to one example of an error detector, a working-machine-side trigger detector, a stop controller, and a working-machine-side connection detector of the present disclosure. The tool control circuit 550 corresponds to one example of a working machine stop circuit of the present disclosure.

<2-2. Processes>
<2-2-1. Restart Inhibition Process at Power Supply Connection>

Figure 7:
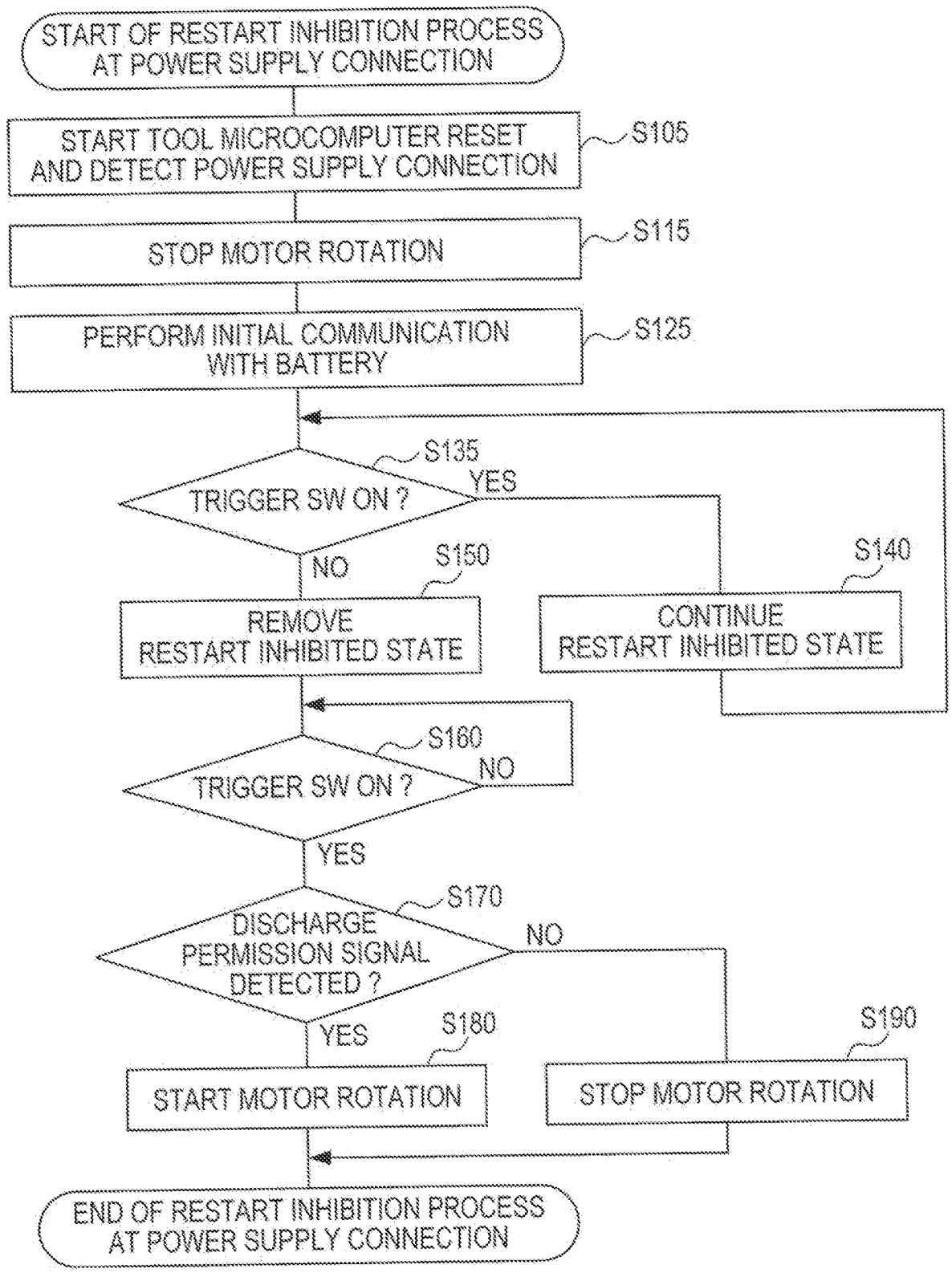
FIG. 7 is a flowchart showing steps of a restart inhibition process at power supply connection in a power tool according to the second embodiment.

Next, the restart inhibition process at power supply connection performed by the tool control circuit 550 will be described with reference to a flowchart of FIG. 7. In response to connection to the battery pack 300 and reception of power supply from the battery pack 300, the tool control circuit 550 starts to perform the present process.

Firstly, in S105, in response to receiving the reset cancellation signal from the reset IC 540, the tool control circuit 550 starts to operate. Further, in response to input of the reset cancellation signal, the tool control circuit 550 detects connection of the battery pack 300. The reset cancellation signal is a power supply connection signal indicating that the battery pack 300 has been connected.

Next, in S115, a stop signal for stopping rotation of the motor 600 is generated as the motor control signal, and the stop signal is output to the motor driver circuit 560. This results in stopping rotation of the motor 600.

Then, in S125, an initial communication with the battery control circuit 350 is performed. Specifically, information on the model number of the power tool 500, the number of attachments thereto of battery packs, and so forth is transmitted to the battery control circuit 350 through the tool-side communication terminal 534. Also, information on the model number of the battery pack 300, the number of uses thereof, and so forth is received from the battery control circuit 350 through the tool-side communication terminal 534.

Subsequently, in S135, it is determined whether the ON state of the trigger switch 510 is detected. If it is determined in S135 that the ON state of the trigger switch 510 is detected, the process proceeds to S140.

In S140, a restart inhibited state is continued. Specifically, the stop signal is continuously output to the motor driver circuit 560. In order to inhibit a sudden restart of the power tool 500, in a case where connection of the battery pack 300 is detected and also the ON state of the trigger switch 510 is detected, the stop signal is continuously output to the motor driver circuit 560 until an OFF state of the trigger switch 510 is detected once.

In contrast, if it is determined in S135 that the OFF state of the trigger switch 510 is detected, the process proceeds to S150. In S150, the restart inhibited state is removed. Once the OFF state of the trigger switch 510 is detected, a sudden restart of the power tool 500 does not occur. Thus, in this case, the restart inhibited state is removed. Specifically, the tool control circuit 550 shifts to a detection waiting state in which detection of the ON state of the trigger switch 510 is awaited. Upon completion of the process of S1150, the process proceeds to S160.

In S160, it is determined whether the ON state of the trigger switch 510 is detected. If it is determined in S160 that the ON state of the trigger switch 510 is not detected, the tool control circuit 550 waits until detection of the ON state. If it is determined in S160 that the ON state of the trigger switch 510 is detected, the process proceeds to S170.

In S170, it is determined whether the discharge permission signal input from the battery pack 300 through the discharge signal input terminal 535 is detected. If it is determined in S170 that the discharge permission signal is detected, the process proceeds to S180. In contrast, if it is determined in S170 that the discharge permission signal is not detected, the process proceeds to S190.

In S180, the motor control signal is generated. The user operates a not-shown setting switch to set a speed mode and a direction of rotation of the motor 600. Examples of the speed mode may include a low speed mode, a medium speed mode, and a high speed mode. The tool control circuit 550 generates the motor control signal according to the set speed mode and direction of rotation. Then, the generated motor control signal is output to the motor driver circuit 560 to start rotation of the motor 600.

On the other hand, in S190, the stop signal is output to the motor driver circuit 560 to stop rotation of the motor 600. This is the end of the present process.

<2-2-2. Restart Inhibition Process in Battery Pack>

Figure 8:
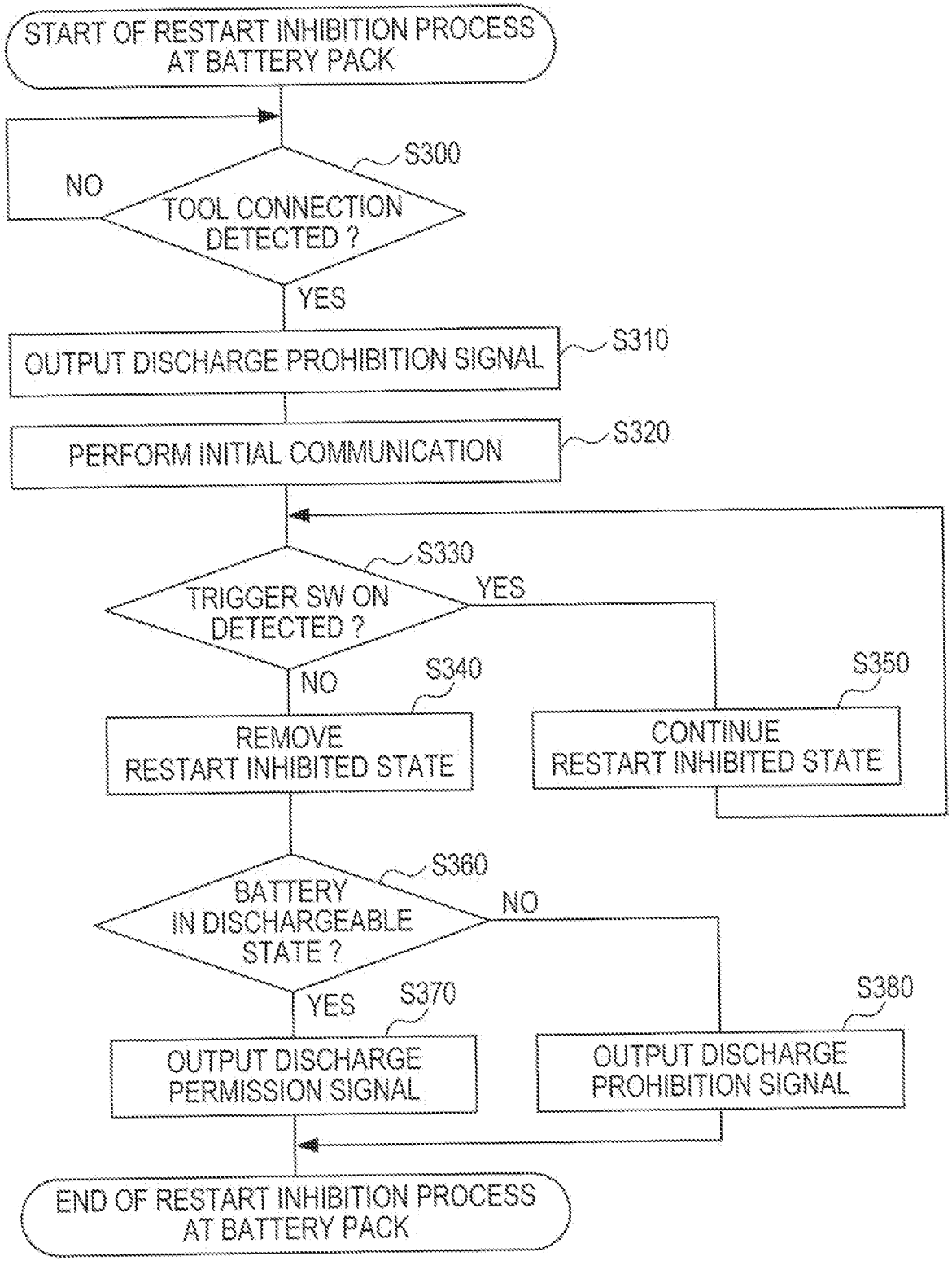
FIG. 8 is a flowchart showing steps of a restart inhibition process in a battery pack according to the second embodiment.

Next, a restart inhibition process at tool connection performed by the battery control circuit 350 will be described with reference to a flowchart of FIG. 8.

Firstly, in S300, it is determined whether tool connection is detected. Specifically, it is determined whether the tool connection signal is input through the state signal input terminal 333. If it is determined in S300 that tool connection is not detected, the battery control circuit 350 waits until its determination that tool connection is detected. If it is determined in S300 that tool connection is detected, the process proceeds to S310.

In S310, the discharge prohibition signal for prohibiting power supply to the motor 600 is output to the power tool 500 through the discharge signal output terminal 335.

Then, in S320, the battery control circuit 350 performs an initial communication with the tool control circuit 550 to exchange the information with each other.

Subsequently, in S330, it is determined whether the ON state of the trigger switch 510 is detected. Specifically, it is determined whether the second trigger operation signal is input through the state signal input terminal 333. If it is determined in S330 that the ON state of the trigger switch 510 is detected, the process proceeds to S350.

In S350, the restart inhibited state is continued. Specifically, the discharge prohibition signal is continuously output to the power tool 500 through the discharge signal output terminal 335. This enables inhibition of a sudden restart of the motor 600 by the tool control circuit 550, and also enables inhibition of a sudden restart of the motor 600 by the battery control circuit 350. In other words, backup redundancy of control for inhibiting restart of the motor 600 can be achieved by control by the tool control circuit 550 and control by the battery control circuit 350.

In contrast, if it is determined in S330 that the OFF state of the trigger switch 510 is detected, the process proceeds to S340. In S340, the restart inhibited state is removed. Specifically, the battery control circuit 350 shifts to an output waiting state in which output of the discharge permission signal is awaited.

Subsequently, in S360, it is determined whether the battery 380 is in a discharge permitted state. Specifically, it is determined whether the battery 380 is not in an overdischarge state or an overheated state but in a dischargeable state. If it is determined in S360 that the battery 380 is in the discharge permitted state, the process proceeds to S370. If it is determined in S360 that the battery 380 is in a discharge prohibited state, the process proceeds to S380.

In S370, the discharge permission signal is output to the power tool 500 through the discharge signal output terminal 335. In the present embodiment, in a case where the restart inhibited state is removed and also the battery 380 is in the discharge permitted state, output of the discharge permission signal is started while the trigger switch 510 is in the OFF state. This makes it possible to start rotation of the motor 600 immediately upon shift of the trigger switch 510 from the OFF state to the ON state.

On the other hand, in S380, the discharge prohibition signal is output to the power tool 500 through the discharge signal output terminal 335. This is the end of the present process.

<2-2-3. Restart Inhibition Process at Error Occurrence>

Figure 9:
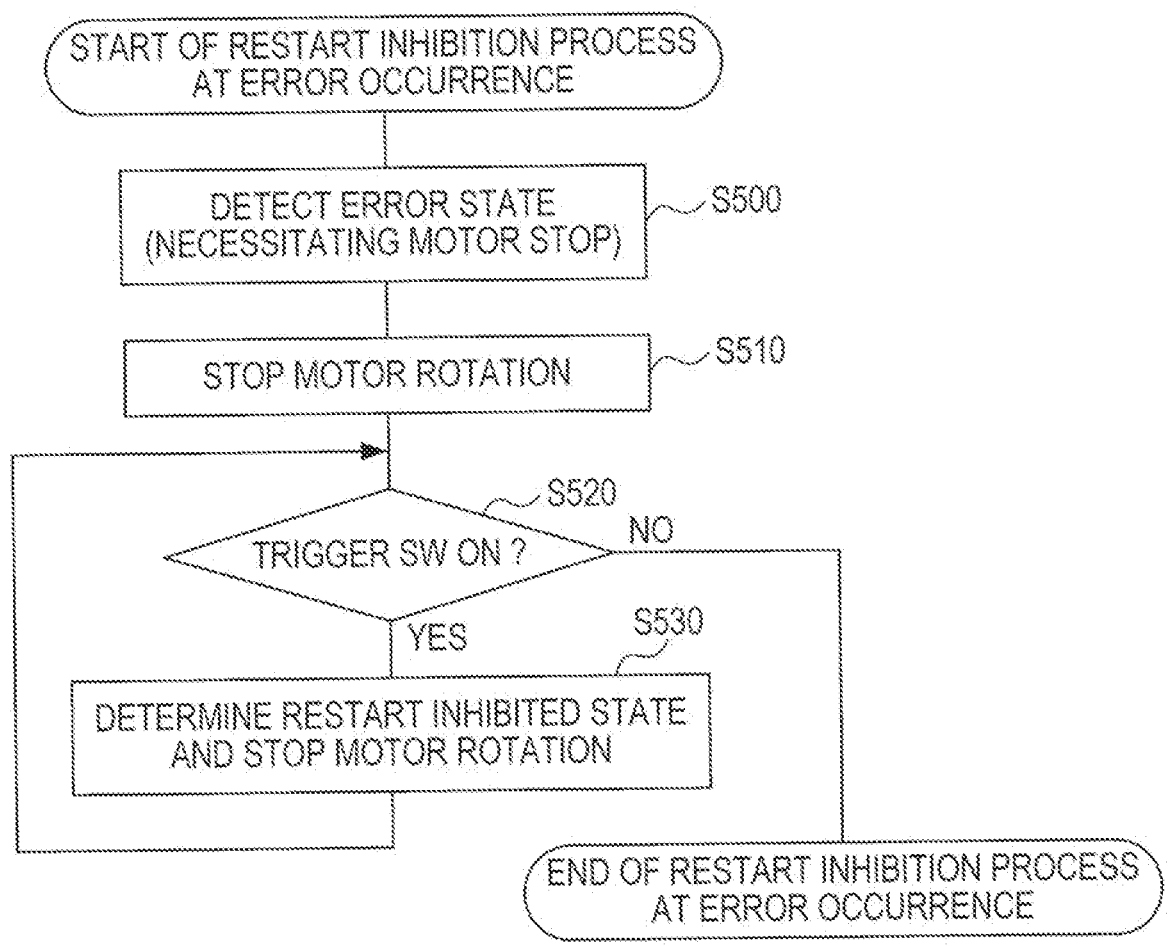
FIG. 9 is a flowchart showing steps of a restart inhibition process at error occurrence in the power tool according to the second embodiment.

Next, the restart inhibition process at error occurrence performed by the tool control circuit 550 will be described with reference to a flowchart of FIG. 9. The tool control circuit 550 performs the present process in parallel with the restart inhibition process at power supply connection.

Firstly, in S500, the tool control circuit 550 detects an error state in which the motor 600 needs to be stopped, through the discharge signal output terminal 335. Examples of such an error state may include an overheated state and an over-discharge state of the battery pack 300, and an overheated state of the motor driver circuit 560.

Then, in S510, the stop signal is output to the motor driver circuit 560 to stop rotation of the motor 600.

Subsequently, in S520, it is determined whether the ON state of the trigger switch 510 is detected. If it is determined in S520 that the ON state of the trigger switch 510 is detected, the process proceeds to S530.

In S530, the tool control circuit 550 makes a determination of the restart inhibited state, and continues output of the stop signal to the motor driver circuit 560 to stop rotation of the motor 600. In some cases, in response to stop of rotation of the motor 600 caused by occurrence of the error state during use of the power tool 500, the user keeps the trigger switch 510 in the ON state. In such cases, in response to output of the motor control signal from the tool control circuit 550 to the motor driver circuit 560 upon removal of the error state, the power tool 500 suddenly restarts operation. In order to inhibit such a sudden restart of the power tool 500, in the case where the error state is detected, the stop signal is continuously output to the motor driver circuit 560 until the OFF state of the trigger switch 510 is detected once.

Upon completion of the process of S530, the process returns to S520. Then, the processes of S520 and S530 are repeatedly performed until the OFF state of the trigger switch 510 is detected.

In contrast, if it is determined in S520 that the OFF state of the trigger switch 510 is detected, the motor 600 is not rotated thereafter, unless the user intendedly turns the trigger switch 510 from OFF to ON. Thus, in this case, the restart inhibition process ends.

<3. Effects>

According to the second embodiment described so far, the following effects are obtained in addition to an effect similar to the above-described effect (1) of the first embodiment.

(7) In the power tool 500, in response to detection of the error state, the stop signal is output to the motor driver circuit 560 during a period from detection of the error state till detection of the OFF state of the trigger switch 510. This makes it possible to inhibit the motor 600 from suddenly starting to be driven in a case where the error state, such as overheat of the battery pack 300, occurs to stop the motor 600 and then the error state is removed while the trigger switch 510 is kept in the ON state. That is, a sudden restart of the power tool 500 can be inhibited not only in the case where the power tool 500 is connected to the battery pack 300 but also in the case where the error state occurs to stop the motor 600 and then the error state is removed.

(8) In the battery pack 300, in the case where output of the electric power is started and then connection of the power tool 500 is detected and also the ON state of the trigger switch 510 is detected, the discharge prohibition signal is output to the power tool 500 until the OFF state of the trigger switch 510 is detected once. Then, rotation of the motor 600 is stopped by receipt of the discharge prohibition signal output from the battery pack 300. Moreover, in the power tool 500, in the case where connection of the battery pack 300 is detected and also the ON state of the trigger switch 510 is detected, the stop signal for stopping the motor 600 is output to the motor driver circuit 560 until the OFF state of the trigger switch 510 is detected once. Thus, a sudden restart of the power tool 500 can be inhibited not only by the battery pack 300 but also by the power tool 500. That is, backup redundancy of a device for inhibiting a sudden restart of the power tool 500 is achieved, thus enabling improvement of reliability of the device for inhibiting the restart.

(9) The second trigger operation signal input to the battery control circuit 350 of the battery pack 300 is independent of the first trigger operation signal input to the tool control circuit 550 of the power tool 500. This results in achieving backup redundancy of the trigger operation signal of the trigger switch 510, thus enabling improvement of reliability of the trigger operation signal.

(10) The reset cancellation signal input to the tool control circuit 550 at start of power supply is used as the power supply connection signal. Thus, the reset cancellation signal can be utilized effectively.

(11) The discharge prohibition signal output from the battery control circuit 350 and the stop signal output from the tool control circuit 550 each cause the motor 600 to be stopped by mutually different stop devices. This results in achieving backup redundancy of stop control of the motor 600, thus enabling improvement of reliability of the stop control.

(12) In the case where the initial communication between the battery control circuit 350 and the tool control circuit 550 is completed and also the OFF state of the trigger switch 510 is detected, a signal output from the battery control circuit 350 is switched from the discharge prohibition signal to the discharge permission signal. At this time, the trigger switch 510 is in the OFF state, and thus, the motor 600 is not rotated. This enables switching of the signal output from the battery control circuit 350 from the discharge prohibition signal to the discharge permission signal while rotation of the motor 600 is reliably stopped. In addition, since the signal output from the battery control circuit 350 is switched from the discharge prohibition signal to the discharge permission signal while the trigger switch 510 is in the OFF state, the motor 600 can be driven immediately upon the trigger switch 510 entering the ON state.

Third Embodiment

<3-1. Differences from Second Embodiment>

A basic configuration of a third embodiment is similar to that of the second embodiment. Thus, configurations in common will not be described repeatedly, and differences will be mainly described. The reference numerals the same as those in the second embodiment represent the same elements, and refer to the preceding descriptions.

Figure 10:
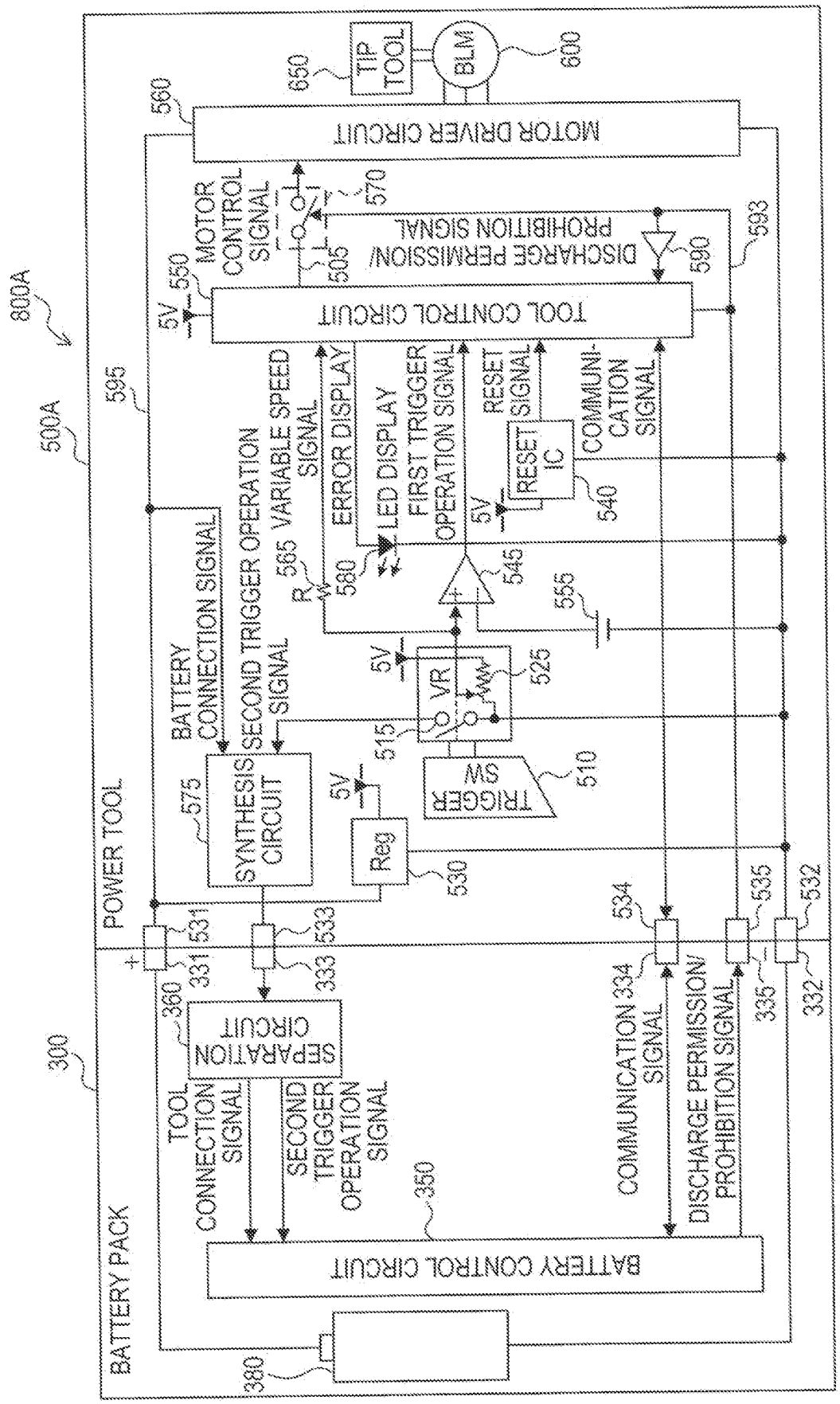
FIG. 10 is a diagram showing a configuration of an electric working machine system according to a third embodiment.

A configuration of an electric working machine system 800A of the third embodiment will be described with reference to FIG. 10. The electric working machine system 800A includes the battery pack 300 and a power tool 500A.

The power tool 500A is different from the power tool 500 of the second embodiment in that the power tool 500A includes a slide resistor 525 instead of the first contact 520. In other words, the power tool 500A includes the second contact 515 and the slide resistor 525 as mutually independent two output paths for the trigger operation signal.

The slide resistor 525 is configured such that a value of resistance VR varies in association with operation (i.e., a pulling amount) of the trigger switch 510. Specifically, the larger the pulling amount of the trigger switch 510 is, the larger the value of resistance VR of the slide resistor 525 is. A user can give a command of a rotational speed of the motor 600 by a speed mode set with the setting switch and by the pulling amount of the trigger switch 510.

A value of voltage (hereinafter referred to as a value of sliding voltage) according to the value of resistance VR of the slide resistor 525 is input, as a variable speed signal, to the tool control circuit 550 via an input resistor 565. The tool control circuit 550 calculates a target rotation speed of the motor 600 based on the set speed mode and the variable speed signal to generate a motor control signal according to the target rotation speed. Specifically, a range of the target rotation speed is set for each speed mode. The tool control circuit 550 sets the target rotation speed such that the larger the pulling amount of the trigger switch 510 is, the larger the target rotation speed is, within the range corresponding to the set speed mode.

The value of sliding voltage is input to a non-inverting input terminal of a comparator 545. To be input to an inverting input terminal of the comparator 545 is a value of voltage of a reference power supply 555. In a case where the value of sliding voltage exceeds the value of voltage of the reference power supply 555, the comparator 545 outputs the first trigger operation signal as a HIGH signal to the tool control circuit 550. The value of voltage of the reference power supply 555 is set to a value causing input of the first trigger operation signal to the tool control circuit 550 in response to the user's pulling of the trigger switch 510, if only a little.

A value of resistance R of the input resistor 565 is set to a value sufficiently larger than the value of resistance VR of the slide resistor 525 at a maximum pulling amount. In the event of runaway of the tool control circuit 550, a HIGH signal may be output from a variable speed signal input port of the tool control circuit 550. In this case, to be input to the non-inverting input terminal of the comparator 545 is a value of a divided voltage obtained by dividing a value of voltage of the signal output from the variable speed signal input port by a ratio of the value of resistance VR to the value of resistance R. In response to the value of the divided voltage being higher than the value of voltage of the reference power supply 555, the first trigger operation signal is incorrectly input to the tool control circuit 550. Thus, the value of resistance R is set to be sufficiently greater than the value of resistance VR. This results in sufficiently lowering the value of the divided voltage input to the non-inverting input terminal of the comparator 545, thus making it possible to avoid incorrect input of the first trigger operation signal to the tool control circuit 550.

According to the third embodiment described so far, the following effect is obtained in addition to effects similar to the above-described effect (1) of the first embodiment and the above-described effects (7) to (12) of the second embodiment.

(13) The second trigger operation signal is output from the second contact 515, which is opened and closed in association with operation of the trigger switch 510. In addition, the first trigger operation signal is output from the slide resistor 525, in which the value of resistance VR varies in association with the pulling amount of the trigger switch 510. This results in achieving backup redundancy of the trigger operation signal, thus enabling improvement of reliability of the trigger operation signal.

Fourth Embodiment

<4-1. Differences from Second Embodiment>

A basic configuration of a fourth embodiment is similar to that of the second embodiment. Thus, configurations in common will not be described repeatedly, and differences will be mainly described. The reference numerals the same as those in the second embodiment represent the same elements, and refer to the preceding descriptions.

Figure 11:
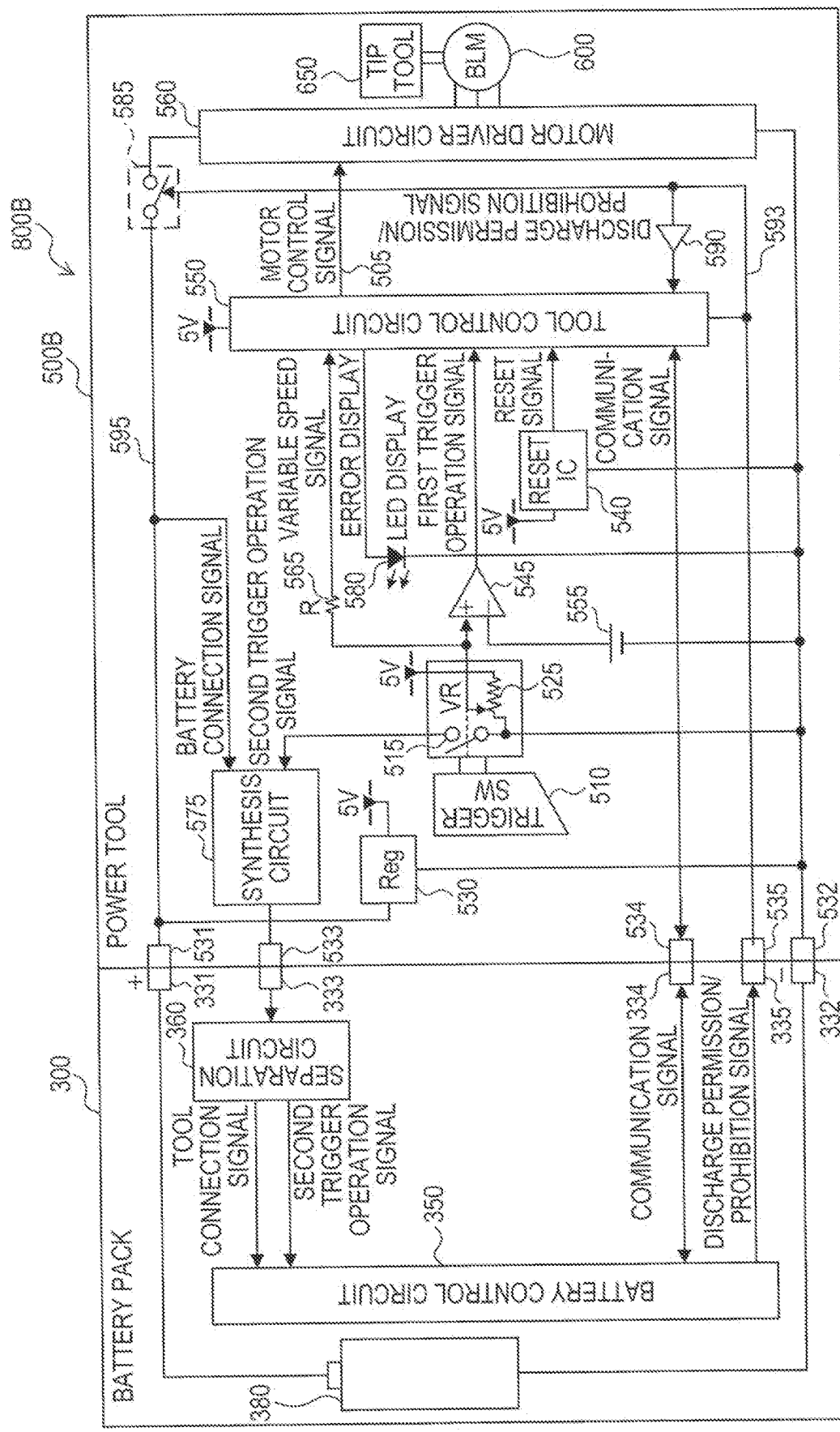
FIG. 11 is a diagram showing a configuration of an electric working machine system according to a fourth embodiment.

A configuration of an electric working machine system 800B of the fourth embodiment will be described with reference to FIG. 11. The electric working machine system 800B includes the battery pack 300 and a power tool 500B.

The power tool 500B is different from the power tool 500 of the second embodiment in that the power tool 500B includes a motor stop switch 585 instead of the motor stop switch 570 provided on the signal output path 505. The motor stop switch 585 is provided on the positive electrode line 595 connecting the tool-side positive terminal 531 to a positive side of the motor driver circuit 560.

The motor stop switch 585 enters an ON state in response to input of the discharge permission signal through the discharge signal input terminal 535. This results in power supply to the motor driver circuit 560. In contrast, the motor stop switch 585 enters an OFF state in response to input of the discharge prohibition signal through the discharge signal input terminal 535. This results in interrupting power supply to the motor driver circuit 560 to stop rotation of the motor 600. In the present embodiment, the motor stop switch 585 corresponds to one example of a first stop circuit of the present disclosure.

According to the fourth embodiment described so far, effects similar to the above-described effect (1) of the first embodiment, the above-described effects (7) to (12) of the second embodiment, and the above-described effect (13) of the third embodiment are obtained.

Fifth Embodiment

<5-1. Differences from Third Embodiment>

A basic configuration of a fifth embodiment is similar to that of the third embodiment. Thus, configurations in common will not be described repeatedly, and differences will be mainly described. The reference numerals the same as those in the third embodiment represent the same elements, and refer to the preceding descriptions.

An electric working machine system of the fifth embodiment has a configuration similar to the electric working machine system 800A of the third embodiment. The power tool 500A of the fifth embodiment is different from the power tool 500A of the third embodiment in that the discharge permission signal or the discharge prohibition signal output from the battery pack 300 is monitored and determination on a fault in the signal input from the battery pack 300 is performed in the restart inhibition process at power supply connection. In the present embodiment, the functions achieved by the tool control circuit 550 include one example of a signal determiner of the present disclosure.

<5-2. Restart Inhibition Process at Power Supply Connection>

Figure 12:
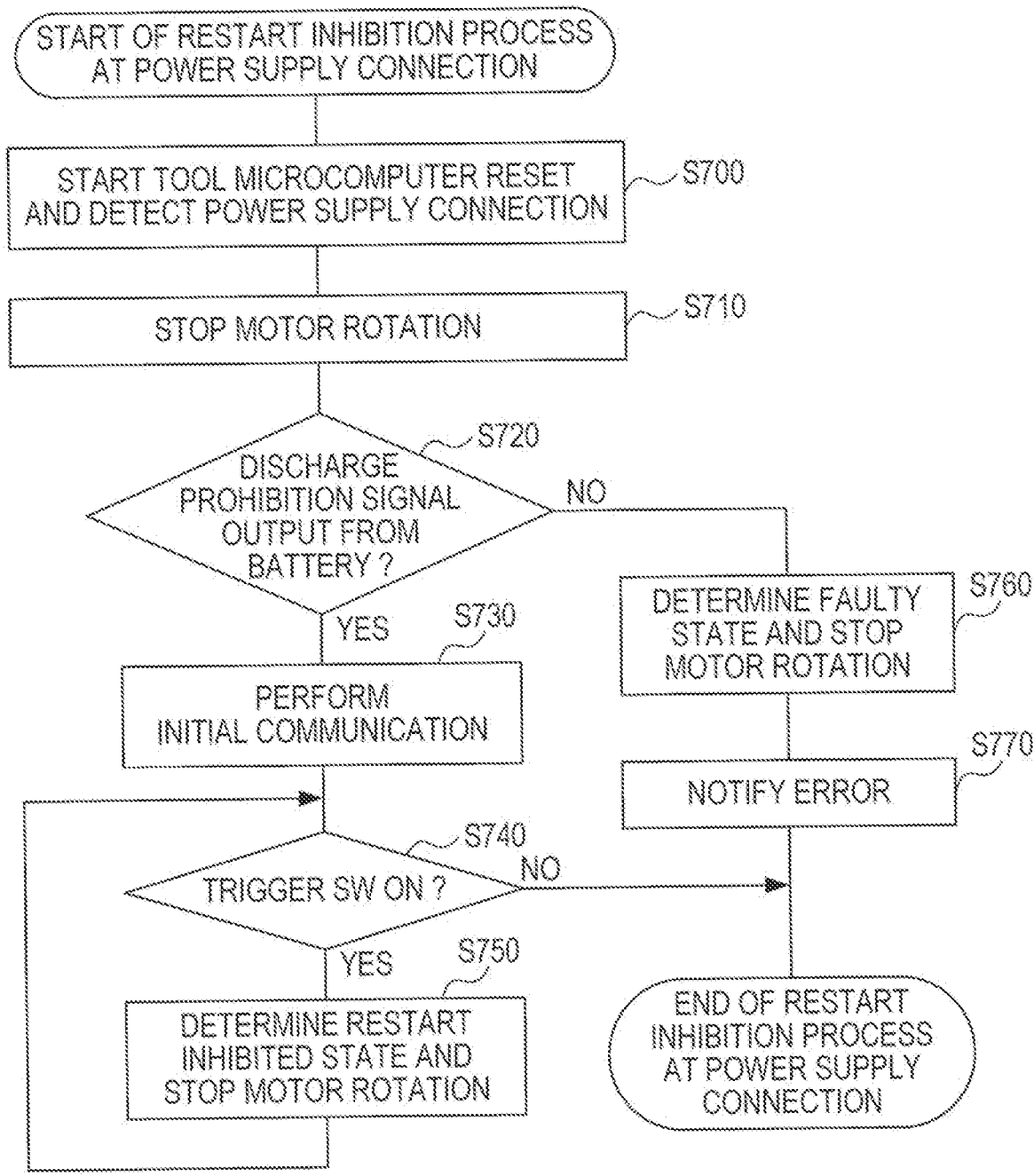
FIG. 12 is a flowchart showing steps of a restart inhibition process at power supply connection according to a fifth embodiment.

Next, a restart inhibition process at power supply connection performed by the tool control circuit 550 of the fifth embodiment will be described with reference to a flowchart of FIG. 12. The tool control circuit 550 starts to perform the present process in response to connection to the battery pack 300 and receipt of power supply from the battery pack 300.

Firstly, in S700 and S710, processes similar to those in S105 and S115, respectively, are performed.

Subsequently, in S720, in order to diagnose a fault in the discharge prohibition signal input through the discharge signal input terminal 535, it is determined whether the discharge prohibition signal is output from the battery pack 300. In other words, it is determined whether the discharge prohibition signal is input through the discharge signal input terminal 535. The battery pack 300 outputs the discharge prohibition signal in the absence of detection of connection of the power tool 500A. Further, as shown in the flowchart of FIG. 8, even if connection of the power tool 500A is detected, the battery pack 300 keeps outputting the discharge prohibition signal until the restart inhibited state is removed.

Thus, in a case where the signal input from the battery pack 300 through the discharge signal input terminal 535 is not faulty and also immediately after start of power supply to the power tool 500A, the signal input from the battery pack 300 should be the discharge prohibition signal. In a case where the discharge permission signal is input from the battery pack 300 during a period the discharge prohibition signal should be input, it can be determined that the discharge prohibition signal input through the discharge signal input terminal 535 is faulty.

If it is determined in S720 that the discharge prohibition signal is output, the process proceeds to S730. In S730, the initial communication with the battery control circuit 350 is performed, and the process proceeds to S740.

In S740, it is determined whether the ON state of the trigger switch 510 is detected. In S740, if it is determined that the ON state of the trigger switch 510 is detected, the process proceeds to S750, whereas if it is determined that the OFF state of the trigger switch 510 is detected, the restart inhibition process at power supply connection ends.

In S750, the tool control circuit 550 makes a determination of the restart inhibited state, and continues output of the stop signal to the motor driver circuit 560 to stop rotation of the motor 600. Upon completion of the process of S750, the process returns to S740. Then, the processes of S740 and S750 are repeatedly performed until the OFF state of the trigger switch 510 is detected.

In contrast, if it is determined in S720 that the discharge permission signal is output, the process proceeds to S760. In S760, the tool control circuit 550 determines that the signal input through the discharge signal input terminal 535 is faulty, and outputs the stop signal to the motor driver circuit 560 to stop rotation of the motor 600.

Subsequently, in S770, the LED 580 is turned on to notify the error to the user, and the restart inhibition process at power supply connection ends.

According to the fifth embodiment described so far, the following effect is obtained in addition to effects similar to the above-described effect (1) of the first embodiment, the above-described effects (7) to (12) of the second embodiment, and the above-described effect (13) of the third embodiment.

(14) In the power tool 500A, in response to detection of connection of the battery pack 300, it is determined whether the output signal from the battery pack 300 is the discharge permission signal. Then, in the case where the output signal is the discharge permission signal although the output signal should be the discharge prohibition signal when the battery pack 300 is in a non-faulty state, the stop signal is output to the motor driver circuit 560 to cause the motor 600 to stop. That is, if it is determined that the signal input through the discharge signal input terminal 535 is faulty, the motor 600 is stopped. This enables improvement of reliability of the signal input from the battery pack 300.

(15) Since a faulty state of the signal input from the battery pack 300 is notified using the LED 580, the user can recognize the faulty state of the electric working machine system 800A.

Other Embodiments

The embodiments for carrying out the present disclosure have been described so far; however, the present disclosure is not limited to the above-described embodiments, and can be carried out in variously modified forms.

(a) In the second to fifth embodiments, the tool control circuit 550 performs both of the restart inhibition process at power supply connection and the restart inhibition process at error occurrence. However, the tool control circuit 550 may perform only either of them.

(b) The present disclosure may be applied to any power tools as long as they are for use in operation such as cutting, machining, polishing, or drilling. Specifically, the present disclosure may be applied to an electric hammer, an electric hammer drill, an electric drill, an electric driver, an electric wrench, an electric grinder, an electric circular saw, an electric reciprocating saw, an electric jigsaw, an electric cutter, an electric chainsaw, an electric plane, an electric nailer, and the like. Further, the present disclosure may be applied not only to the power tools but also to electric apparatuses for gardening, such as a grass cutter, a lawn mower, a hedge trimmer, and a trimmer.

(c) Two or more functions performed by a single element in the above-described embodiments may be achieved by two or more elements, and a single function performed by a single element may be achieved by two or more elements. Two or more functions performed by two or more elements may be achieved by a single element, and a single function performed by two or more elements may be achieved by a single element. Part of a configuration in the above-described embodiments may be omitted. At least part of a configuration in the above-described embodiments may be added to or replace another configuration in the above-described embodiments.

(d) In addition to the above-described power-supply apparatus and the electric working machine system including the power-supply apparatus a component, the present disclosure can also be implemented in various forms, such as an electric working machine, and a restart inhibition method.

What is claimed is:

1. A battery pack, comprising:
    a connector configured to be removably connected to an electric working machine, the electric working machine including:
        a motor configured to receive an electric power from the battery pack to thereby generate a driving force;
        a tool configured to be driven by the driving force;
        a trigger switch; and
        a state signal output terminal configured to output an operation signal, the operation signal indicating an ON state or an OFF state of the trigger switch;
    a state signal input terminal in the connector and configured to be connected to the state signal output terminal; and
    a battery control circuit configured to:
        detect a connection of the electric working machine to the battery pack, based on an electric power supplied from the battery pack to the electric working machine through the connector;
        detect the ON state or the OFF state of the trigger switch based on the operation signal input to the state signal input terminal; and
        in response to (i) detecting the connection of the electric working machine to the battery pack, and also to (ii) detecting the ON state of the trigger switch, output a discharge prohibition signal to the electric working machine until the OFF state of the trigger switch is detected once, the discharge prohibition signal prohibiting supply of the electric power to the motor.

2. The battery pack according to claim 1,
wherein the state signal output terminal is configured to output a connection signal, the connection signal indicating of the connection of the electric working machine to the battery pack, and
wherein the battery control circuit is configured to, in response to input of the connection signal to the state signal input terminal, detect the connection of the electric working machine to the battery pack.

3. The battery pack according to claim 2, further comprising:
a separation circuit connected to the state signal input terminal, the separation circuit configured to separate the connection signal and the operation signal from each other, and the connection signal and the operation signal being input via the state signal input terminal.

4. The battery pack according to claim 3, wherein the battery control circuit is configured to (i) be connected to the separation circuit, and also (ii) output the discharge prohibition signal based on the connection signal and the operation signal, both input via the separation circuit.

5. The battery pack according to claim 1,
wherein the battery control circuit is configured to, in response to detecting the OFF state of the trigger switch, shift to a detection waiting state, and wait, in the detection waiting state, for detection of the ON state of the trigger switch.

6. The battery pack according to claim 1,
wherein the battery control circuit is configured to:
in response to detecting the ON state of the trigger switch after detecting the OFF state of the trigger switch once, determine whether the battery pack is in a dischargeable state; and
in response to determining that the battery pack is in the dischargeable state, output a discharge permission signal to the electric working machine, the discharge permission signal permitting the supply of the electric power to the motor.

7. A system, comprising:
an electric working machine; and
a battery pack,
the electric working machine including:
 a trigger switch configured to be operated by a user;
 a motor configured to receive an electric power from the battery pack to thereby generate a driving force;
 a tool configured to be driven by the driving force; and
 a state signal output terminal configured to output a first operation signal, the first operation signal indicating an ON state or an OFF state of the trigger switch,
the battery pack including:
 a connector configured to be removably connected to the electric working machine;
 a state signal input terminal in the connector and configured to be connected to the state signal output terminal; and
 a battery control circuit configured to:
  detect connection of the electric working machine to the battery pack, based on an electric power supplied from the battery pack to the electric working machine through the connector;
  detect the ON state or the OFF state of the trigger switch based on the first operation signal input to the state signal input terminal; and
  in response to (i) detecting the connection of the electric working machine to the battery pack, and also to (ii) detecting the ON state of the trigger switch, output a discharge prohibition signal to the electric working machine until the OFF state of the trigger switch is detected once, the discharge prohibition signal prohibiting supply of the electric power to the motor.

8. The system according to claim 7,
wherein the electric working machine further includes a synthesis circuit, the synthesis circuit configured to (i) receive input of a connection signal and the first operation signal, and also (ii) output a synthesized signal generated by synthesizing the connection signal and the first operation signal, and the connection signal indicating a connection of the electric working machine to the battery pack.

9. The system according to claim 8, wherein the synthesis circuit is configured to (i) be connected to the state signal output terminal, and also (ii) output the synthesis signal to the battery pack via the state signal output terminal.

10. The system according to claim 9, wherein the state signal input terminal is configured to receive the synthesis signal from the state signal output terminal.

11. The system according to claim 10, wherein the battery pack includes a separation circuit connected to the state signal input terminal, the separation circuit configured to separate the connection signal and the operation signal from each other, and the connection signal and the operation signal being input via the state signal input terminal.

12. The system according to claim 7, wherein the electric working machine further includes a tool control circuit, the tool control circuit configured to:
detect a connection of the electric working machine to the battery pack;
receive a second operation signal indicating the ON state or the OFF state of the trigger switch;
detect the ON state or the OFF state of the trigger switch based on the second operation signal received;
in response to (i) detecting the connection of the electric working machine to the battery pack, and also to (ii) detecting the ON state of the trigger switch, output a stop signal until the OFF state of the trigger switch is detected once, the stop signal causing the motor to stop.

13. The system according to claim 12, wherein the tool control circuit is configured to:
receive a power supply connection signal indicating the connection of the electric working machine to the battery pack; and
detect the connection of the electric working machine to the battery pack, in response to receiving the power supply connection signal.

14. The system according to claim 13, wherein the power supply connection signal is a reset cancellation signal to be input to the tool control circuit.

15. The system according to claim 12,
wherein the electric working machine further includes a contact portion and a slide resistor, the contact portion having two contacts,
wherein the contact portion is configured to output the first operation signal, and
wherein the slide resistor is configured to output the second operation signal.

16. The system according to claim 12,
wherein the tool control circuit is configured to output a control signal for driving the motor,
wherein the electric working machine further includes;
 a drive circuit configured to (i) drive the motor in accordance with the control signal from the tool control circuit, and also (ii) stop the motor in accordance with the stop signal from the tool control circuit;
a discharge signal input terminal configured to receive input of the discharge prohibition signal;
a signal output path configured to connect the tool control circuit to the drive circuit;
a supply path configured to supply the electric power from the battery pack to the drive circuit; and
a stop switch on the signal output path or on the supply path and connected to the discharge signal input terminal, and
wherein the stop switch is configured to enter a non-conducting state, based on the discharge prohibition signal input to the discharge signal input terminal.

17. A system, comprising:
an electric working machine; and
a battery pack,
the electric working machine including;
    a trigger switch configured to be operated by a user;
    a motor configured to receive an electric power from the battery pack to thereby generate a driving force;
    a tool configured to be driven by the driving force;
    a state signal output terminal;
    a discharge signal input terminal; and
    a tool control circuit configured to:
        detect connection of the electric working machine to the battery pack;
        receive a first operation signal indicating the ON state or the OFF state of the trigger switch;
        detect the ON state or the OFF state of the trigger switch, based on the first operation signal; and
        in response to (i) detecting the connection of the electric working machine to the battery pack, and also to (ii) detecting the ON state of the trigger switch, cause the motor to stop until the OFF state of the trigger switch is detected once,
the battery pack including:
    a state signal input terminal configured to be connected to the state signal output terminal;
    a discharge signal output terminal configured to be connected to the discharge signal input terminal; and
    a battery control circuit configured to:
        receive a connection signal and a second operation signal via the state signal input terminal and the state signal output terminal, the connection signal indicating the connection of the electric working machine to the battery pack, and the second operation signal indicating the ON state or the OFF state of the trigger switch; and
        output a discharge prohibition signal to the discharge signal output terminal, based on the connection signal and the operation signal, both received, the discharge prohibition signal prohibiting supply of the electric power to the motor.

* * * * *